United States Patent
Anazawa et al.

(10) Patent No.: US 12,031,913 B2
(45) Date of Patent: Jul. 9, 2024

(54) MICROCHIP AND MANUFACTURING METHOD THEREFOR, AND MULTI-CHANNEL FLUORESCENCE DETECTION DEVICE

(71) Applicant: Hitachi, Ltd., Tokyo (JP)

(72) Inventors: Takashi Anazawa, Tokyo (JP); Takahide Yokoi, Tokyo (JP); Yuichi Uchiho, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 15/036,181

(22) PCT Filed: Dec. 25, 2013

(86) PCT No.: PCT/JP2013/084707
§ 371 (c)(1),
(2) Date: May 12, 2016

(87) PCT Pub. No.: WO2015/097791
PCT Pub. Date: Jul. 2, 2015

(65) Prior Publication Data
US 2016/0282270 A1    Sep. 29, 2016

(51) Int. Cl.
*G01N 21/64* (2006.01)
*B01L 3/00* (2006.01)
(Continued)

(52) U.S. Cl.
CPC ........ *G01N 21/6454* (2013.01); *B01L 3/5027* (2013.01); *G01N 21/6402* (2013.01);
(Continued)

(58) Field of Classification Search
CPC ....... G01N 2021/6469; G01N 21/6402; G01N 21/6452; G01N 2015/0065
See application file for complete search history.

(56) References Cited

U.S. PATENT DOCUMENTS

| 5,938,908 A | 8/1999 | Anazawa et al. |
| 6,270,641 B1 | 8/2001 | Griffiths et al. |

(Continued)

FOREIGN PATENT DOCUMENTS

| JP | 9-288088 A | 11/1997 |
| JP | 2003-503715 A | 1/2003 |

(Continued)

OTHER PUBLICATIONS

A. Tsupryk et al., "Novel design of multicapillary arrays for high-throughput DNA sequencing," Electrophoresis, vol. 27, No. 14 (2006), pp. 2869-2879.

(Continued)

*Primary Examiner* — Carolyn Fin
(74) *Attorney, Agent, or Firm* — Crowell & Moring LLP

(57) ABSTRACT

Efficient simultaneous laser-irradiation-fluorescence detection is performed for a plurality of channels of a microchip and simple and highly sensitive parallel analysis of a plurality of samples is enabled. In a microchip 1 made of an optically transparent solid material $m_1$ with a refractive index $n_1$, a plurality of channels 2 filled with a material $m_2$ with a refractive index $n_2$ and a plurality of channels 3 filled with a material $m_3$ with a refractive index $n_3$ are alternately arranged in parallel on the same plane. Here, $m_1$, $m_2$ and $m_3$ are selected such that a relation of $n_2<n_1<n_3$ is satisfied. The material $m_2$ is an optically transparent liquid suitable for targeted analysis. When a laser beam 4 is focused and irradiated perpendicularly to the individual channels 2 and 3 along the same plane, refraction of the laser beam 4 by the channels 2 and refraction of the laser beam 4 by the channels 3 are counterbalanced. For this reason, the laser beam 4 propagates linearly on the same plane and the individual channels 2 and 3 can be simultaneously and efficiently irradiated with the laser beam. Fluorescence emitted from (Continued)

the individual channels 2 and 3 is detected independently and simultaneously using a collimating lens 9, a filter and a diffraction grating 10, an imaging lens 11, a two-dimensional sensor 12, and a data analysis system 13, from a direction perpendicular to the same plane.

22 Claims, 20 Drawing Sheets

(51) Int. Cl.
  *G01N 21/03* (2006.01)
  *G01N 21/05* (2006.01)
  *G01N 27/447* (2006.01)

(52) U.S. Cl.
  CPC ....... *G01N 21/6452* (2013.01); *G01N 27/447* (2013.01); *G01N 27/44721* (2013.01); *G01N 27/44726* (2013.01); *G01N 27/44791* (2013.01); *B01L 2300/0858* (2013.01); *B01L 2300/0864* (2013.01); *G01N 2021/0346* (2013.01); *G01N 21/05* (2013.01); *G01N 2201/06113* (2013.01)

(56) References Cited

U.S. PATENT DOCUMENTS

| | | | |
|---|---|---|---|
| 7,223,364 B1* | 5/2007 | Johnston | B01L 3/5023 422/502 |
| 9,212,995 B2* | 12/2015 | Moll | G01N 21/6486 |
| 9,766,206 B2* | 9/2017 | Yang | G01N 27/44782 |
| 9,921,160 B2* | 3/2018 | Anazawa | B01L 3/5027 |
| 2002/0162746 A1 | 11/2002 | Carrillo | |
| 2004/0263923 A1* | 12/2004 | Moon | G01N 33/54366 359/2 |
| 2005/0155861 A1* | 7/2005 | Guzman | G01N 27/44726 204/451 |
| 2007/0196834 A1* | 8/2007 | Cerrina | C12P 19/34 435/5 |
| 2009/0308470 A1 | 12/2009 | Bergstroem et al. | |
| 2010/0137163 A1 | 6/2010 | Link et al. | |
| 2010/0163715 A1 | 7/2010 | Gorfinkel et al. | |
| 2011/0036992 A1* | 2/2011 | Fukumoto | B01L 3/502715 250/458.1 |

FOREIGN PATENT DOCUMENTS

| | | |
|---|---|---|
| JP | 2003-279487 A | 10/2003 |
| JP | 2004-530133 A | 9/2004 |
| JP | 2005-514224 A | 5/2005 |
| JP | 2005-514591 A | 5/2005 |
| JP | 2008-542749 A | 11/2008 |
| JP | 2009-536313 A | 10/2009 |
| JP | 2011-59095 A | 3/2011 |
| WO | WO 01/02093 A2 | 1/2001 |
| WO | WO 03/054527 A1 | 7/2003 |
| WO | WO 03/055660 A2 | 7/2003 |

OTHER PUBLICATIONS

International Search Report (PCT/ISA/210) issued in PCT Application No. PCT/JP2013/084707 dated Mar. 11, 2014 with English-language translation (four (4) pages).

Japanese-language Office Action issued in counterpart Japanese Application No. 2018-034019 dated Feb. 5, 2019 (three pages) with English Machine Translation (five pages).

* cited by examiner

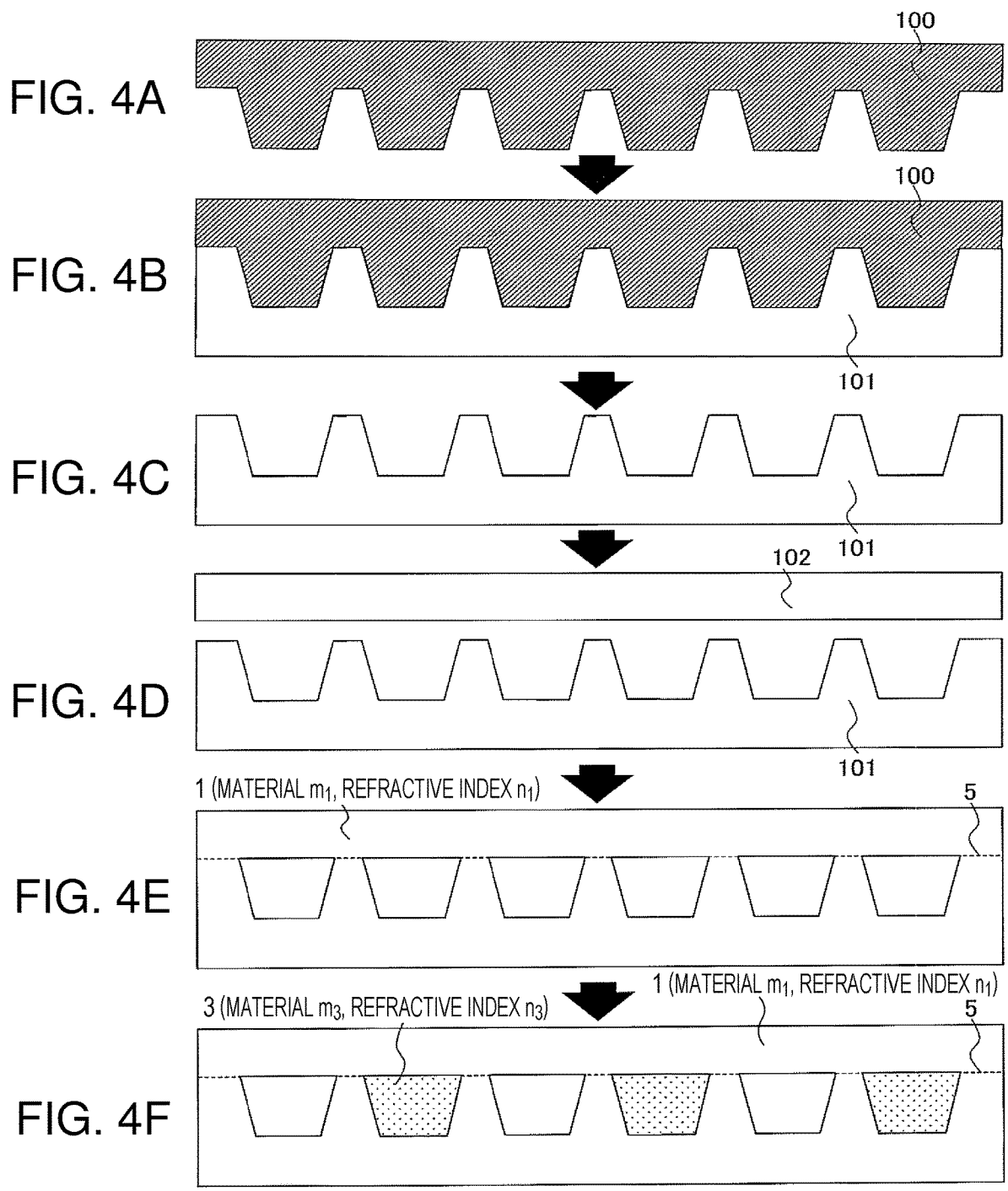

CONFIGURATION a
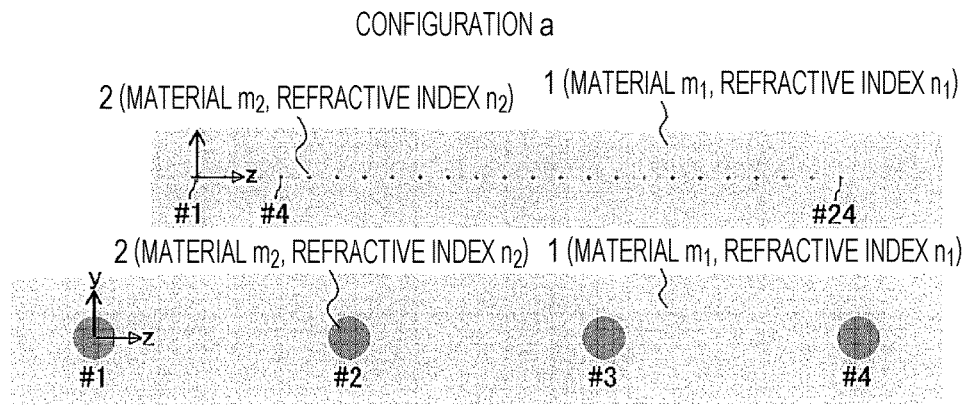
FIG. 8A
FIG. 8B
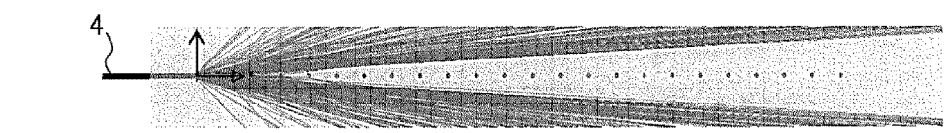
FIG. 8C
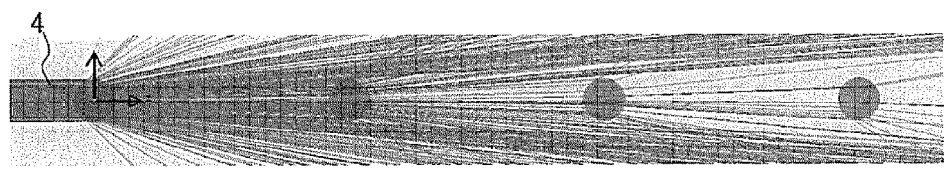
FIG. 8D
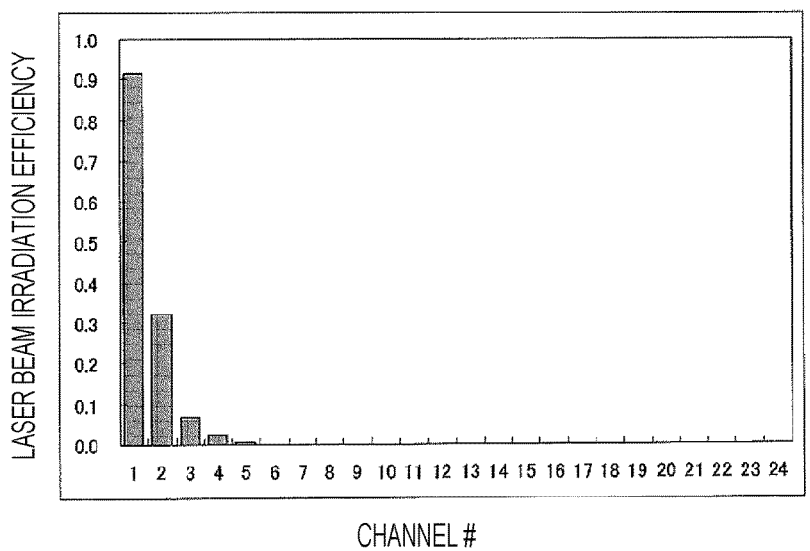
FIG. 8E CONFIGURATION b CONFIGURATION c

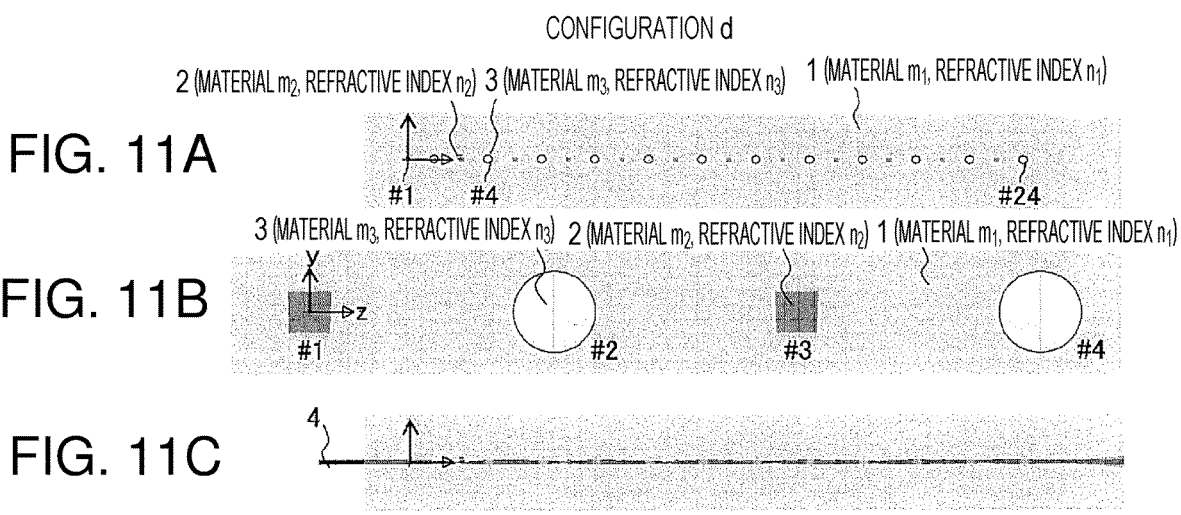
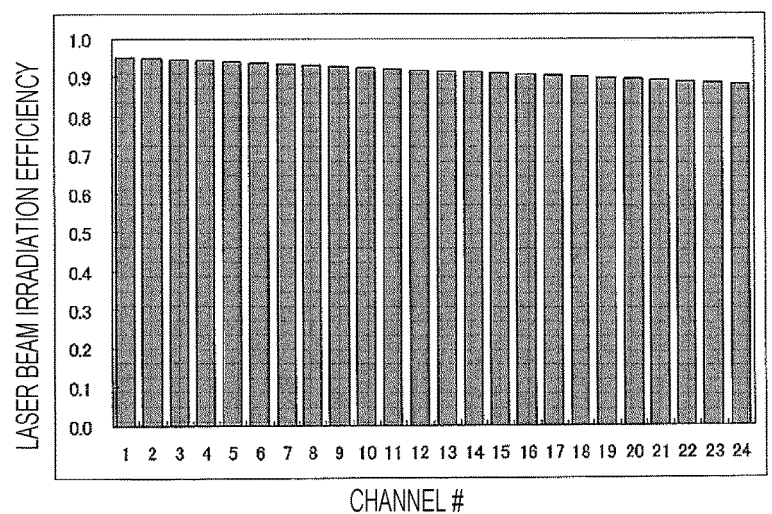

CONFIGURATION g

FIG. 15D

CONFIGURATION g'
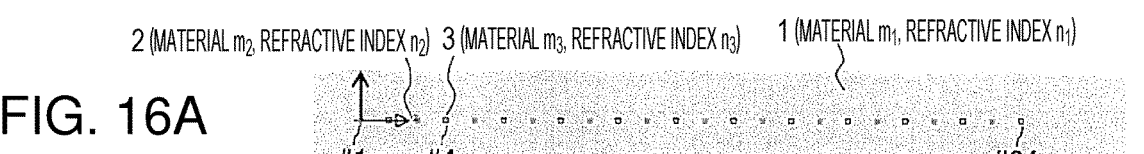
FIG. 16A
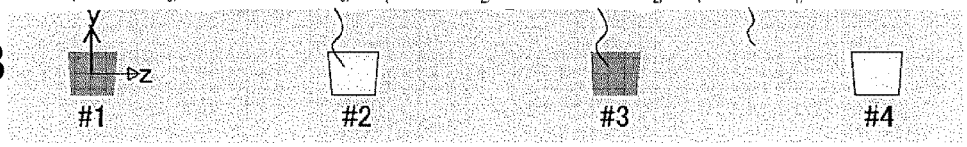
FIG. 16B
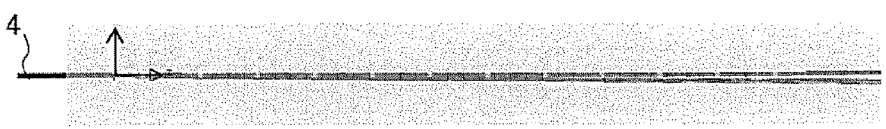
FIG. 16C
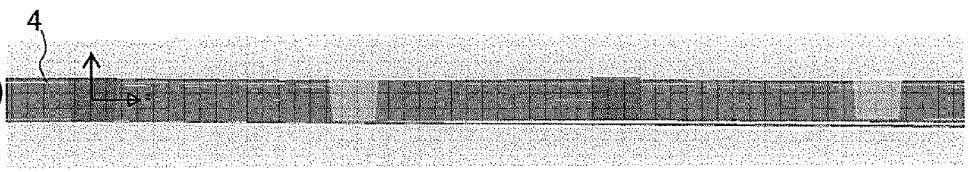
FIG. 16D
FIG. 16E
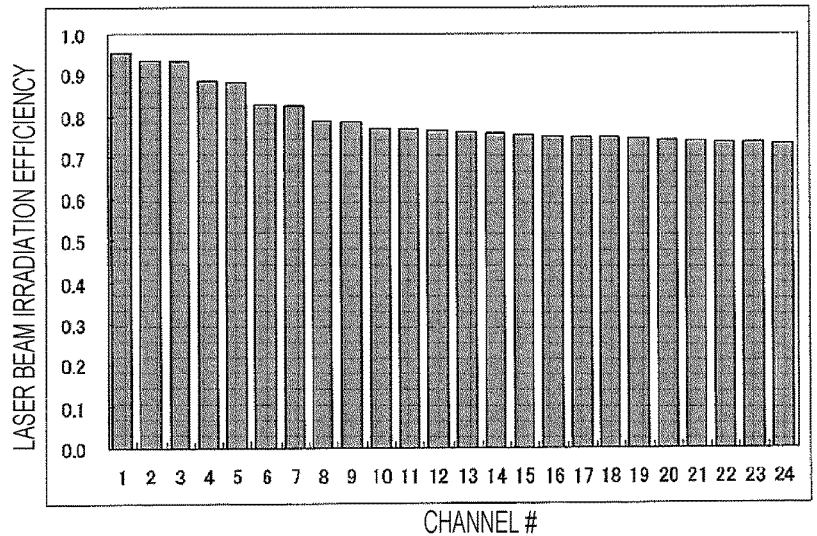

CONFIGURATION h

MICROCHIP AND MANUFACTURING METHOD THEREFOR, AND MULTI-CHANNEL FLUORESCENCE DETECTION DEVICE

TECHNICAL FIELD

The present invention relates to a microchip to perform highly sensitive fluorescence detection of a fluorescent analyte existing in a plurality of channels provided inside and a manufacturing method thereof and a multichannel fluorescence detection system to analyze a sample using the microchip.

BACKGROUND ART

Research and development of a microchip for configuring a channel to be a flow channel or a reaction vessel of a micrometer size on a chip and analyzing a sample such as a biological material are performed energetically for 20 years and a practical use thereof progresses. As for the microchip, transparent glass or resin is often used as a material, a size is various from several mm to several tens of cm, and a thickness is smaller than the size. By the microchip, a very small amount of sample can be analyzed easily and simply on the spot in a short time. As examples of the microchip already put to practical use, there are PCR, real-time PCR, digital PCR, electrophoresis analysis, immunity analysis (immunoassay), a flow cytometer (cell sorter), single cell analysis, and a micro reactor. The microchip into which processes of the analysis including introduction and extraction of a sample, mixture with a reagent, and reaction are integrated is called micro TAS (Total Analysis System) or Lab on a Chip and research and development to solve various kinds of problems for the practical use is continuously performed actively. As a measurement mechanism of the microchip, optical measurement capable of measuring an analyte existing in a channel without a contact is often used. For example, a biological analyte is labeled with a fluorescent analyte in the channel, a non-labeled fluorescent analyte is removed, a laser beam is irradiated, and emitted fluorescence is measured. Or, the biological material is observed by an optical microscope and a shape or a number thereof is measured.

Because the microchip made of the resin can be manufactured by processing technology such as injection molding and nanoimprint molding and can be produced in large quantities at a low cost, the microchip is disposable. The disposable microchip is particularly important in the field where it is strongly required to avoid contamination, such as a medical diagnosis and a food inspection. In addition, it is important to configure multiple channels on a single chip and measure the channels in parallel, where multiple items for one sample are analyzed in parallel or a plurality of kinds of samples are measured in parallel and the throughput of the measurement is improved to reduce an analysis cost for each analysis. Or, a plurality of places in a single channel are measured in parallel, so that a time-series change of reaction or separation can be analyzed.

Here, performing laser-induced fluorescence detection efficiently on the plurality of channels provided in the microchip is a big challenge and methods according to the related art are classified into the following (1) to (5). In all methods, laser irradiation portions of the plurality of channels are arranged in parallel on the same plane in the chip. Hereinafter, this plane is called an array plane. When the plurality of places in the single channel are measured in parallel, the channel is turned down several times, so that measurement places of the channel are arranged in parallel on the same plane in the chip.

(1) Beam expansion method: a laser beam is expanded to span a plurality of channels, the plurality of channels are simultaneously irradiated, and fluorescence from the plurality of channels is simultaneously detected.

There are the case in which the laser beam is expanded in a linear shape and the plurality of channels are simultaneously irradiated with the laser beam and the case in which the laser beam is expanded in a circular shape and the plurality of channels are simultaneously irradiated with the laser beam. As compared with the case in which the laser beam is narrowed to a single channel and the single channel is irradiated with the laser beam, in the case in which N channels are simultaneously irradiated with the laser beam, if the laser beam is expanded in a linear shape, a laser-beam strength density decreases to (1/N) or less and if the laser beam is expanded in a circular shape, the laser-beam strength density decreases to $(1/N^2)$ or less. For this reason, fluorescence detection sensitivity of each channel decreases. As one form of a beam expansion method, the laser beam may be divided into a plurality of laser beams and each of the laser beams may be irradiated to each channel. However, this method also has the same challenge as the above case.

(2) Scan method: a laser beam is narrowed to a single channel, the laser beam scans a plurality of channels, and each channel is irradiated sequentially.

As compared with the case in which the laser beam is narrowed to the single channel, the laser beam is irradiated to the single channel, and the scan is not performed, when N channels are irradiated serially by scan, an effective density of laser-beam strength decreases to (1/N) or less and fluorescence detection sensitivity of each channel decreases. In addition, time resolution of each channel also decreases to (1/N) or less. Because a scan mechanism is necessary, there are also defects in that a device has a large size and a high cost and a failure increases.

(3) Independent irradiation detection system method: systems for narrowing a laser beam to a single channel, irradiating the laser beam to the single channel, and detecting fluorescence from the same channel are arranged for a plurality of channels, respectively.

If an optimal laser or detector can be used for each channel, high fluorescence detection sensitivity can be obtained even in any channel. However, in this case, a cost of the systems greatly increases. Meanwhile, because a plurality of channels arranged on the same chip should approach each other, it is physically difficult to provide a laser irradiation fluorescence detection system with high sensitivity for each channel. Therefore, it is necessary to adopt a laser irradiation fluorescence detection system that has relatively low sensitivity, a small size, and a low cost.

(4) Optical waveguide method: a laser beam is irradiated to an optical waveguide adjacent to a plurality of channels, the plurality of channels are irradiated with an evanescent wave, and fluorescence from the plurality of channels is simultaneously detected.

Because the evanescent wave can greatly decrease a laser-beam irradiation volume, this is advantageous to the case in which fluorescence derived from a single fluorescent molecule is detected with high sensitivity, by reducing background light derived from a solution in the channel. However, in many cases, a target analyte detected by the microchip has a large number of molecules, not a small number of molecules. In this case, if the laser-beam irradiation volume is excessively decreased, the sensitivity is decreased.

(5) Side-entry method (side-entry laser-beam irradiation): a laser beam is irradiated to cross a plurality of channels along an array plane from a side surface of a chip and fluorescence from the plurality of channels is simultaneously detected from a direction vertical to the array plane.

Highest sensitivity can be expected with a simplest configuration. However, because the laser beam is refracted at an interface of each channel, it is difficult to irradiate the plurality of channels with high efficiency. When a laser-beam width is set to be larger than a channel width and the laser beam is irradiated, a laser-beam strength density decreases and fluorescence detection sensitivity decreases. In PTL 1, the refracted laser beam can be condensed by inserting a lens or a mirror between the channels, the laser beam can pass through the plurality of channels in a state in which the laser beam is narrowed, and highly sensitive fluorescence detection is enabled. Meanwhile, in PTL 2, a side-entry method in the case in which a plurality of capillaries instead of the plurality of channels on the microchip are arranged on the same plane is disclosed. The refracted laser beam can be condensed by inserting a rod lens between the capillaries, the laser beam can pass through the plurality of capillaries in a state in which the laser beam is narrowed, and highly sensitive fluorescence detection is enabled.

CITATION LIST

Patent Literature

PTL 1: JP 2011-59095 A
PTL 2: JP H9-288088 A

SUMMARY OF INVENTION

Technical Problem

The side-entry method, or the side-entry laser-beam irradiation, in which the laser beam is introduced vertically to long axes of the individual channels along the array plane where the long axes of the plurality of channels are arranged in parallel, in a state in which the laser beam is narrowed, for example, a state in which the laser-beam width is reduced to almost the channel width, the laser beam passes through the plurality of channels, and the laser beam is simultaneously irradiated to the plurality of channels is a most efficient laser-induced fluorescence detection method of the plurality of channels and a method in which highest sensitivity can be realized. Here, a center axis of the laser beam when the introduced laser beam propagates linearly in the plurality of channels without being refracted is called a side-entry axis hereinafter. The side-entry method has characteristics that use efficiency of the laser beam is very high, a ratio where the laser beam enters a detector directly or indirectly by reflection is very small, and a ratio where Rayleigh scattering, Raman scattering, and fluorescence generated by a material of the microchip by laser-beam irradiation is intermingled with fluorescence to be a measurement target emitted from the channel is very small, as compared with the other methods according to the related art. These contribute to realizing highly sensitive fluorescence detection by a simple configuration.

In PTL 1, the lens or the mirror is inserted between the channels, the laser beam refracted at the time of passing through the channel and diverged from the side-entry axis is focused, the laser beam is returned to the side-entry axis, and the laser beam passes through the next channel. By repeating the above process, the side-entry method is realized. However, it is difficult to arrange the lenses between the channels in actuality. First, spaces to insert the lenses into the microchip needs to be formed. For example, after the microchip having the plurality of channels is manufactured, it is necessary to form holes penetrating the microchip and having sizes enabling storages of the lenses by cutting. Next, it is necessary to insert the lenses into the spaces and fix the lenses in states in which optical center axes of the lenses are matched with the side-entry axis. Here, the center axes of the optical systems such as the lenses need to be aligned with both a long axis direction of the channels and a direction vertical to the array plane of the channels, with precision of a micrometer level. Because it is very difficult to realize such position precision by only mechanical precision when the lenses are inserted into the holes provided in the microchip, it is necessary to finely adjust the positions of the lenses and fix the lenses, after each lens is inserted between the channels. If the center axes of the lenses deviate from the side-entry axis, the laser beam is deflected from the side-entry axis. For this reason, the plurality of channels cannot be simultaneously irradiated. Because the alignment requires trouble and time, a mechanism for performing fine adjustment for the alignment is necessary separately, which results in increasing a manufacturing cost of the microchip. This is particularly disadvantageous to the case in which the microchip should be disposable.

In addition, in PTL 1, the position of each lens is fixed to the microchip while the center axis of the introduced laser beam and the center axis of each lens are matched with each other. For this reason, the center axis of the introduced laser beam cannot be freely moved in the long axis direction of each channel. This means that it is impossible to set the side-entry axis to an ideal position where there is no scratch or dust in the channel and maximize the detection sensitivity. Likewise, it is impossible to expand the laser beam in only the long axis direction of each channel or set a plurality of side-entry axes of which positions are shifted in the long axis direction of each channel. This means that it is impossible to catch the behavior of a fluorescent analyte existing in each channel by a two-dimensional image or detect fluorescence emitted from different kinds of fluorescent analytes independently or with high sensitivity.

In addition, in PTL 1, because the lens is inserted between the channels and the lens is aligned with high precision, it is necessary to increase a distance between the channels adjacent to each other and the number of channels, which can be provided in the single microchip, decreases as compared with (1) the beam expansion method and (2) the scan method according to the related art.

Meanwhile, in PTL 2, the plurality of capillaries made of glass and the plurality of rod lenses made of glass are alternately arranged on the same plane in the water, the laser beam is introduced in parallel to the array plane and vertically to the long axis of each capillary, and the side-entry method is realized. In the capillary in the water, reflection of the laser beam on an external surface is suppressed as compared with reflection in case of the capillary in the air. Because the capillary functions as a concave lens in the water, the laser beam diverges from the side-entry axis by each capillary. However, because the rod lens arranged to be adjacent to the capillary functions as a convex lens in the water, the rod lens focuses the diverged laser beam again. By repeating this, simultaneous laser-beam irradiation and highly sensitive fluorescence detection on the plurality of capillaries are enabled.

In this method, because outer diameters of the capillaries and the rod lenses can be equalized, the capillaries and the rod lenses are sandwiched by two flat plates and arranged alternately so that the center axes of each capillary and each rod lens are aligned on the same plane. This means that the side-entry method can be easily realized by matching the side-entry axis and the center axes of each capillary and each rod lens and simultaneous detection of the multiple capillaries is enabled. In addition, each rod lens has the same optical characteristic in an axial direction hereof. For this reason, even though an irradiation position of the laser beam is shifted in the axial directions of the capillary and the rod lens, the side-entry axis is shifted equally and the side-entry method can be realized equally. That is, it is possible to set the ideal side-entry axis where the sensitivity is maximized, take the two-dimensional fluorescent image by expanding the laser beam in only the axial direction of the capillary, or shift the plurality of different laser beams in the axial direction of the capillary, irradiate the plurality of different laser beams, and independently measure the fluorescence emitted from the different fluorescent analytes at the plurality of side-entry axes.

However, this method is enabled because the capillary and the rod lens having the same outer diameters are used. If the capillary is replaced with the channel provided in the microchip, it is very difficult to arrange the rod lens such that the center axis of the rod lens is matched with the array plane of the channel, similar to the array of the lens in PTL 1. The manufacturing thereof requires considerable trouble and time, the microchip is not avoided from becoming expensive, and the microchip is not disposable.

The present invention has been made to resolve the problem in the side-entry method according to the related art and provides a method that simultaneously irradiates a laser beam narrowed to a width almost equal to a channel width to a plurality of channels provided in a single microchip by a side-entry method and detects fluorescence with high sensitivity, with a simple configuration. At the same time, the present invention provides a method that can move an irradiation position of a laser beam and a side-entry axis in a long axis direction of each channel and irradiate the laser beam after expanding the laser beam in the long axis direction of each channel or irradiate a plurality of different laser beams after shifting the side-entry axis in the long axis direction of each channel. As a material of the microchip, cheap resin as well as glass is used. As a method of manufacturing the microchip, a method having superior low cost characteristic and mass productivity such as injection molding and nanoimprint molding as well as a method requiring time and a cost such as cutting processing, optical shaping processing, and semiconductor processing is used. For example, the injection molding using a resin material is excellent in the low cost characteristic and the mass productivity. The present invention provides a method to realize a side-entry method for a plurality of channels in a microchip while achieving disposability of the microchip.

Solution to Problem

A microchip according to the present invention includes: a plurality of channels which are provided in a transparent solid material having a refractive index $n_1$, wherein respective long axes of the plurality of channels are arranged in parallel on the same plane in at least a partial region, a first channel filled with a first material having a refractive index $n_2$ and a second channel filled with a second material having a refractive index $n_3$ are mixed in the plurality of channels, and a relation of $n_2<n_1<n_3$ is satisfied. At least the partial region includes a region on which a laser beam is incident.

As an example, the first channel and the second channel are alternately arranged in an array direction of the plurality of channels.

The second material can be a liquid. In this case, the second channel is preferably sealed to prevent the second material from being removed.

As an example, in the plurality of channels, cross-sectional shapes vertical to the long axes in at least the partial region are circular shapes.

As an example, in the plurality of channels, cross-sectional shapes vertical to the long axes in at least the partial region are trapezoidal shapes.

A multichannel fluorescence detection system according to the present invention includes: a microchip in which a plurality of channels are provided in a transparent solid material having a refractive index $n_1$, such that long axes of the individual channels are arranged in parallel on the same plane in at least a partial region; a laser light source; an irradiation optical system which causes a laser beam generated from the laser light source to be incident vertically to the long axes of the plurality of channels arranged in parallel, along the same plane from a side surface of the microchip; and a fluorescence detection optical system which separately detects fluorescence generated from fluorescent analytes in the channels by irradiation of the laser beam, wherein a first channel filled with a material having a refractive index $n_2$ and including a fluorescent analyte to be detected and a second channel filled with a second material having a refractive index $n_3$ are mixed in the plurality of channels of the microchip and a relation of $n_2<n_1<n_3$ is satisfied.

A plurality of laser beams may be provided and the plurality of laser beams may be incident on different positions of long axis directions of the plurality of channels.

For example, the fluorescent analyte to be detected is that a biological analyte is labeled with fluorescent dyes. Fluorescence emitted from a plurality of first channels by irradiation of the laser beam is simultaneously detected from a direction vertical to the same plane.

Further, a method of manufacturing a microchip according to the present invention is a method of manufacturing a microchip in which a plurality of channels are provided in a transparent solid material, such that long axes of the individual channels are arranged in parallel on the same plane in at least a partial region, and the method includes: a step of manufacturing a first plate-like transparent solid material, in which a plurality of grooves having cross-sectional shapes of trapezoidal shapes are formed in a surface to be parallel in at least the partial region and which has a refractive index $n_1$, by injection molding; a step of sticking a second plate-like transparent solid material having a refractive index $n_1$ on the first plate-like transparent solid material to make the plurality of grooves into the plurality of channels; and a step of filling materials having a refractive index $n_3$ into predetermined channels of the plurality of channels, wherein the refractive indexes $n_1$ and $n_3$ satisfy a relation of $n_1<n_3$.

As an example, the materials having the refractive index $n_3$ are liquids and the method further includes a step of sealing the channels filled with the materials having the refractive index $n_3$ after filling the materials.

The method further includes: a step of filling media for electrophoresis having a refractive index $n_2$ into channels other than the channels filled with the materials having the refractive index $n_3$, and the refractive index $n_2$ may satisfy a relation of $n_2 < n_1 < n_3$.

Advantageous Effects of Invention

According to the present invention, a laser beam can be simultaneously irradiated to a plurality of channels provided in a single microchip efficiently by a side-entry method. As a result, a system for realizing highly sensitive fluorescence detection of a plurality of channels by exciting a fluorescent analyte existing in each channel and collectively measuring emitted fluorescence from a direction vertical to an array plane of each channel can be configured. The microchip can be manufactured at a low cost by a processing method having mass productivity such as injection molding and the microchip is disposable. In addition, an optical system used for detection can be simplified and an entire system can be configured with a small size and at a low cost.

Other objects, configurations, and effects will become more apparent from the following description of embodiments.

BRIEF DESCRIPTION OF DRAWINGS

FIGS. 4A-4F are process views illustrating manufacturing processes of a microchip.

FIGS. 8A-8E are diagrams illustrating a microchip configuration a and laser-beam tracking simulation results of a side-entry laser-beam irradiation.

FIGS. 11A-11E are diagrams illustrating a microchip configuration d and laser-beam tracking simulation results of a side-entry laser-beam irradiation.

FIGS. 15A-15E are diagrams illustrating a microchip configuration g and laser-beam tracking simulation results of a side-entry laser-beam irradiation.

FIGS. 16A-16E are diagrams illustrating a microchip configuration g' and laser-beam tracking simulation results of a side-entry laser-beam irradiation.

DESCRIPTION OF EMBODIMENTS

Figure 1:
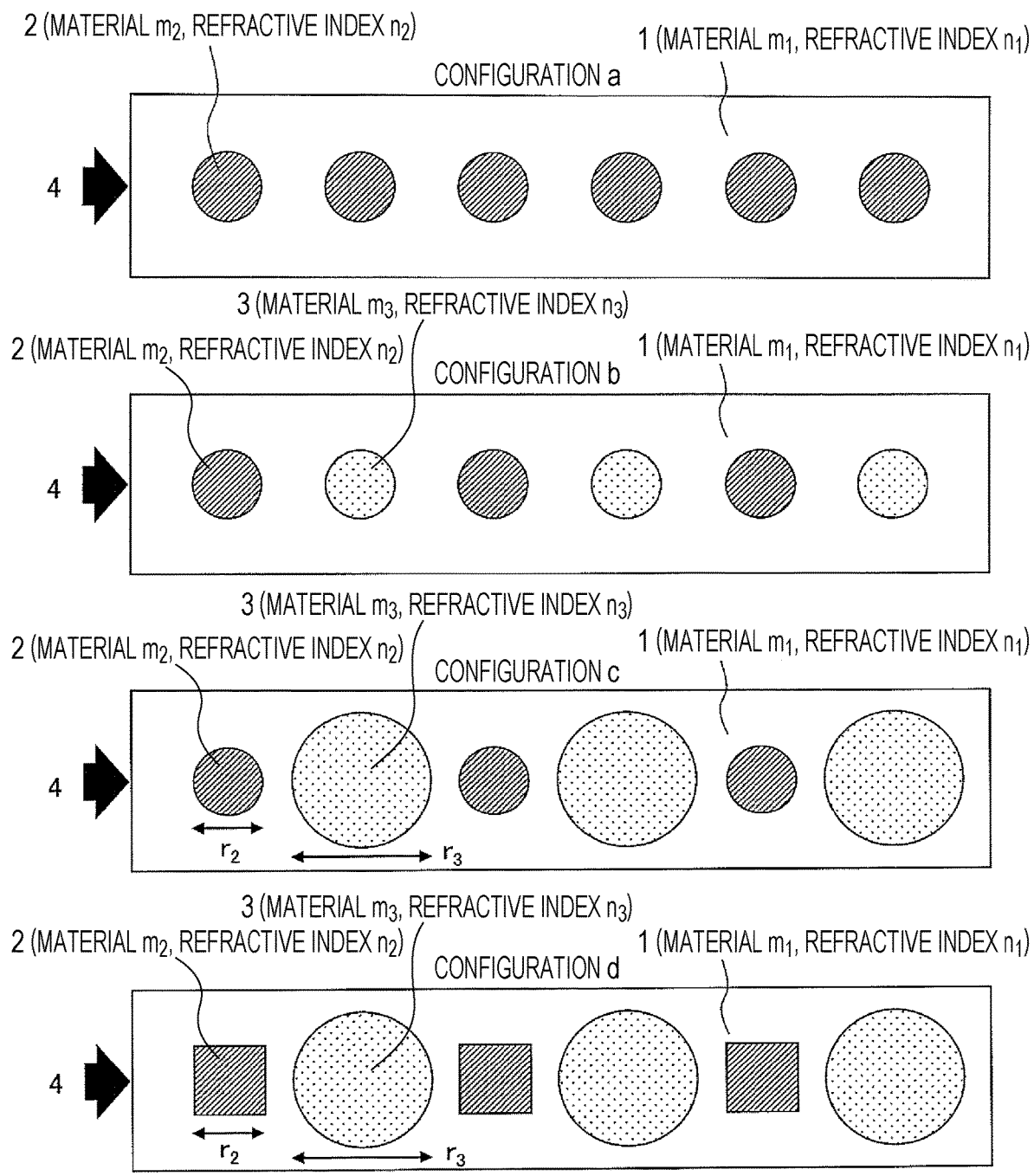
FIG. 1 is a diagram illustrating a configuration example of a microchip including a plurality of channels having circular cross-sections.
Figure 2:
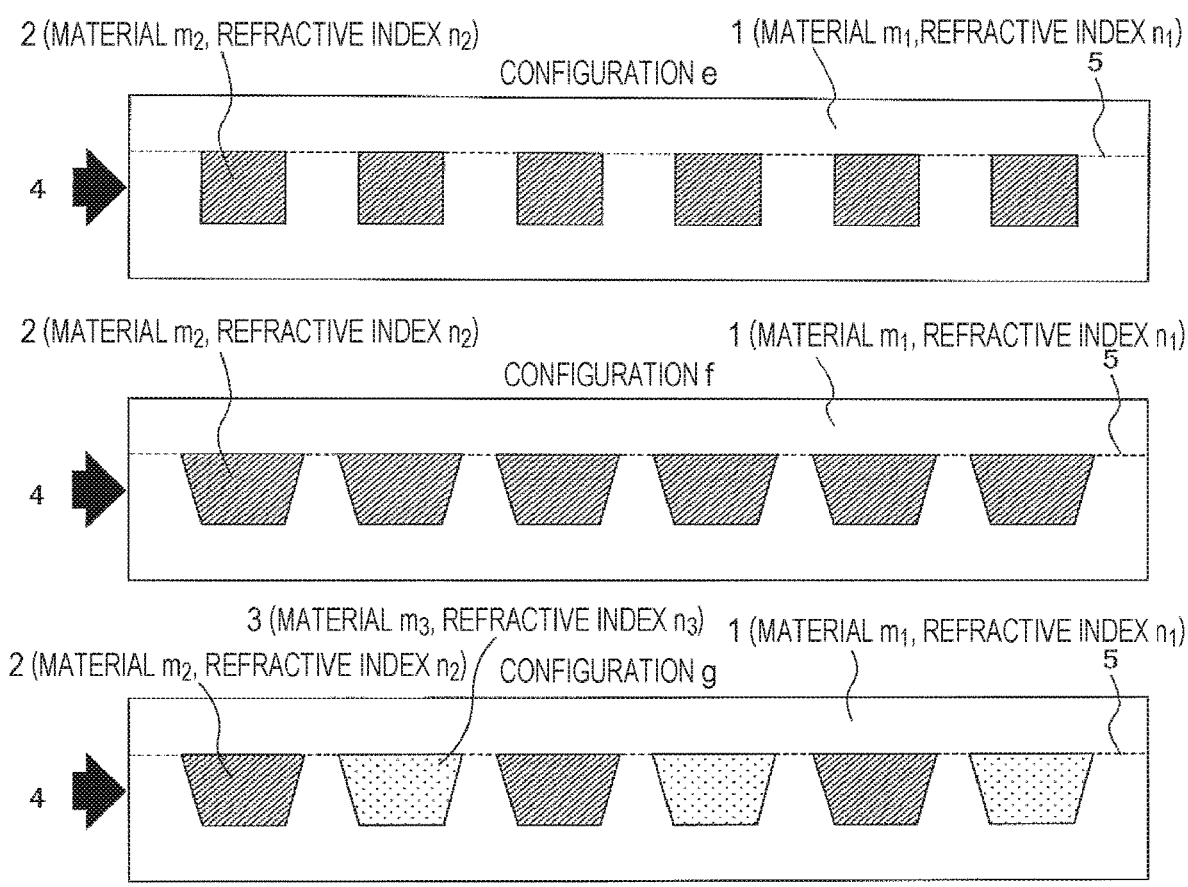
FIG. 2 is a diagram illustrating a configuration example of a microchip including a plurality of channels having rectangular cross-sections.

FIGS. 1 and 2 are schematic cross-sectional views illustrating a basic configuration example of a microchip according to the present invention. FIG. 1 illustrates a configuration example of a microchip including a plurality of channels having circular cross-sections and FIG. 2 illustrates a configuration example of a microchip including a plurality of channels having rectangular cross-sections.

These diagrams are views of a cross-section including side-entry axes of the microchip and vertical to long axes of the plurality of channels. That is, the cross-section is a cross-section that is vertical to the long axes of the individual channels at positions where the long axes of the plurality of channels are arranged in parallel on the same plane in the microchip and includes a center axis of a laser beam irradiated vertically to the long axes of the individual channels along an array plane of the individual channels. The configurations illustrated in these drawings are only representative examples representing a basic idea of the present invention and it goes without saying that the present invention can be applied to other configuration based on the same idea.

In a configuration a of FIG. 1, a microchip 1 is configured using a material $m_1$ having a refractive index $n_1$, a cross-section of each channel 2 has the same circular shape, each channel 2 is arranged at an equal pitch, and each channel 2 is filled with a material $m_2$ having a refractive index $n_2$. The material $m_2$ is a medium in which a target material analyzed by the microchip exists and analysis of the target material is performed using the channel 2 filled with the material $m_2$. Here, although the material $m_1$ is a transparent solid material such as glass or resin, the material $m_2$ is a liquid such as an aqueous solution or a gel-like material. In many cases, $n_2 < n_1$ is satisfied. Here, each channel 2 functions as a concave lens for an introduced laser beam 4. Because the laser beam 4 diverges from a side-entry axis as the laser beam propagates along the side-entry axis, the plurality of channels 2 cannot be irradiated efficiently. In contrast, when a resin material having a low refractive index in which $n_1 < n_2$ is satisfied can be selected, because each channel 2 functions as a convex lens, the laser beam 4 propagates along the side-entry axis without divergence and the plurality of channels 2 can be irradiated efficiently. For example, if fluorine resin is used as the material $m_1$, $n_1 < n_2$ can be satisfied by decreasing $n_1$. Hereinafter, a configuration example of the present invention will be described for the general case of $n_2 < n_1$.

In a configuration b of FIG. 1, the plurality of channels in the configuration a are filled with a material $m_3$ having a refractive index $n_3$ for every other channel. Here, $n_2 < n_1 < n_3$ is set, so that the channel 2 filled with the material $m_2$ functions as a concave lens and the channel 3 filled with the material $m_3$ functions as a convex lens, with respect to the laser beam 4. The material $m_3$ is preferably a material that satisfies the refractive index condition, is transparent, and has a small amount of absorption of the laser beam 4. The material $m_3$ may be a liquid and can be filled easily after the microchip having the plurality of channels is manufactured. Thereby, the convex lens focuses the laser beam 4 diverged from the side-entry axis by the concave lens to return the laser beam 4 to the side-entry axis. By repeating this, the plurality of channels 2 can be irradiated efficiently. Here, cross-sections of the channel 2 and the channel 3 have the same circular shape and the same outer diameter.

The configuration b has the following difference and advantage, as compared with the method according to the related art. In PTL 1, it has been thought that it is difficult to insert a lens between channels and match a center axis of the lens with a side-entry axis with precision of a micrometer level. In the present invention, a part of the plurality of channels is sacrificed and the materials $m_3$ not selected in a normal case and having the refractive index $n_3$ satisfying $n_2 < n_1 < n_3$ are filled, so that the partial channels are converted into the lenses. Because the plurality of channels 2 and 3 are manufactured together by the same working process, it is easy to arrange each channel on the same plane in the microchip 1, that is, match the center axis of each channel with the side-entry axis, there is no fear that a relative position between the individual channels varies, and the plurality of channels can be simultaneously irradiated efficiently by a side-entry method. In addition, because the channel 3 having the convex lens function manufactured as described above is optically equivalent with respect to a long axis direction thereof, a plurality of different laser beams can be simultaneously irradiated with respect to a plurality of side-entry axes of which positions are shifted in long axis directions of the channel 2 and the channel 3.

PTL 2, where a concave lens function of a plurality of capillaries is offset by a convex lens function of a rod lens, is different from the configuration b in a mechanism based on an optical characteristic condition to realize the side-entry method. The capillaries are cylindrical pipes made of quartz glass having a refractive index of $n_3=1.46$ and are filled with separation media for electrophoresis, which has a refractive index of $n_2=1.38$. The rod lens is made of quartz glass having a refractive index of $n_3=1.46$. Meanwhile, there is water having a refractive index of $n_1=1.33$ around a plane where the plurality of capillaries and rod lenses are arranged. The reason why there is the water instead of air around the plane is to decrease reflection loss of the laser beam on external surfaces of the capillaries and improve use efficiency of the laser beam. However, if a refractive index around the plane is further increased and the reflection loss is further decreased, the concave lens function of the capillaries is enhanced and the convex lens function of the rod lens is suppressed. As a result, divergence of the laser beam from the side-entry axis cannot be avoided and the plurality of capillaries cannot be simultaneously irradiated efficiently. That is, in PTL 2, it is essential to satisfy an optical characteristic condition of $n_1 < n_2 < n_3$ and an effect is shown maximally when the condition is satisfied. Meanwhile, in the present invention, a configuration in which, under a condition where an external refractive index $n_1$ of the channel 2 is higher than an internal refractive index $n_2$ of the channel 2, the channel 3 filled with the material $m_3$ having the refractive index $n_3$ higher than the refractive indexes $n_2$ and $n_1$ and the channel 2 filled with the material $m_2$ having the refractive index $n_2$ are mixed is used, it is essential to satisfy the optical characteristic condition of $n_2 < n_1 < n_3$, and an effect is shown maximally when the condition is satisfied. This configuration is not assumed in PTL 2 and it is difficult to realize the configuration using the capillary and the rod lens.

In the configuration b, the outer diameters of the cross-sections of the channel 2 and the channel 3 are equal to each other. For this reason, when the concave lens function of the channel 2 is large, a portion of the laser beam 4 is diverged largely and does not hit the next channel 3. In this case, strength of the laser beam 4 is decreased as the laser beam propagates along the side-entry axis and it becomes difficult to simultaneously irradiate the plurality of channels 2 efficiently.

Therefore, in a configuration c of FIG. 1, different from the configuration b, an outer diameter $r_3$ of the cross-section of the channel 3 filled with the material $m_3$ is larger than an outer diameter $r_2$ of the cross-section of the channel 2 filled with the material $m_2$ ($r_2 < r_3$). As a result, a ratio of a portion where the laser beam 4 diverged by the concave lens function of the channel 2 is not incident on the adjacent channel 3 can be reduced and the plurality of channels 2 can be simultaneously irradiated with the laser beam efficiently as compared with the configuration b.

In a configuration d of FIG. 1, the cross-sectional shape of the channel 2 in the configuration c is changed from a circular shape to a square shape. In this way, because the concave lens function or a refraction function of the channel 2 for the laser beam 4 is reduced, a ratio of a portion where the laser beam 4 diverged by the concave lens function or the refraction function of the channel 2 is not incident on the adjacent channel 3 can be further reduced and the plurality of channels 2 can be simultaneously irradiated with the laser beam efficiently as compared with the configuration c. Similar to the configuration c, the diameter $r_3$ of the channel 3 is set larger than the diameter (width) $r_2$ of the cross-section of the channel 2, so that a side-entry method of the laser beam can be realized more efficiently.

As described above, in the configuration illustrated in FIG. 1, the cross-sectional shapes of the channel 2 and the channel 3 are set to the circular shapes or the square shapes. However, even in other shapes, the same effect is obtained. For example, instead of the circular shape, an elliptical shape or a semicircular shape may be used and instead of the square shape, a rectangular shape may be used. In addition, the individual channels are arranged at the same interval. However, even though the individual channels are not arranged at the same interval, the same effect is obtained. In addition, in the configurations b to d, the channel 2 and the channel 3 are alternately arranged. However, the channel 2 and the channel 3 do not need to be alternately arranged and at least one channel 2 and 3 need to be arranged on the same microchip.

In FIG. 1, the cross-sectional shapes of the channel 2 and the channel 3 are the circular shapes. However, it is difficult to manufacture the microchip having the plurality of such channels at a low cost and with high precision. For example, if a processing method such as optical shaping is used, the configuration illustrated in FIG. 1 can be manufactured by a one-time process and the cross-sectional shape of the channel can be configured as the circular shape. However, because the process requires a processing time, mass productivity is low and a manufacturing cost tends to increase.

Meanwhile, when a processing method such as injection molding having superior mass productivity is used, in the configuration of FIG. 1, the microchip 1 is configured by upper and lower components which boundary surfaces (not illustrated in FIG. 1) include the center axis of each of the channels 2 and 3. The two components are individually manufactured and then their boundary surfaces are bounded to manufacture the microchip. Here, a plurality of grooves having semicircular cross-sectional shapes are formed on the boundary surfaces of the two components. The reason why the above processing method is adopted is that, in the injection molding, because a process for removing a mold after the material $m_1$ such as the resin is poured into the mold and hardening the material is necessary, in the cross-sectional shapes of the grooves that can be formed, widths need to increase from bottoms of the grooves to the boundary surface. Here, mutual position precision at the time of bounding the two components of the microchip 1 becomes a problem. If bounding positions of the two components are shifted in the side-entry axis direction, relative positions of the grooves formed in the two components and having the semicircular cross-sectional shapes are shifted and the components are bonded. As a result, the cross-sectional shape of the manufactured channel may not be the circular shape. Of course, if mutual positions are adjusted with high position precision, the cross-sectional shape can be configured as the circular shape. However, this causes a processing time and a manufacturing cost to increase.

In the configuration example illustrated in FIG. 2, to correspond to the problem, the cross-sectional shapes of the individual channels 2 and 3 are set to rectangular shapes. In the configuration illustrated in FIG. 2, the microchip 1 is configured using upper and lower components which boundary surfaces are shown by a dotted line in FIG. 2. The boundary surface of the upper component is flat and the boundary of the lower component is grooved. These boundary surfaces are bounded to manufacture the microchip. Bounding of the upper and lower components is performed by a method such as thermal compression, the boundary surface 5 is optically transparent, and a layer of air or an adhesive agent is not included. Even though the mutual bounding positions of the upper and lower components are shifted, the shapes or the positions of the individual channels 2 and 3 are not affected by the position shift. Therefore, the microchip 1 illustrated in FIG. 2 can be manufactured by a simple bounding process not requiring the special method with high position precision.

In a configuration e of FIG. 2, a cross-sectional shape of each channel 2 provided in the microchip 1 made of the material $m_1$ is set to the same square shape. Each channel 2 is filled with the material $m_2$. Here, in FIG. 2, an upper and a lower base of a square are parallel to the boundary surface 5 and the side-entry axis and two sides of the square are vertical thereto. Here, because the laser beam 4 is incident vertically to the side surfaces of each channel 2, it is expected that the laser beam 4 propagates linearly along the side-entry axis without refracted in principle. That is, in the configuration e, the plurality of channels 2 can be simultaneously irradiated with the laser beam 4 very efficiently and a fluorescent analyte existing in each channel 2 can be detected with high sensitivity.

However, as in the configuration e, if the cross-sectional shape of each channel 2 is set to the square shape, difficulty is caused when the microchip is manufactured by the processing method such as the injection molding. The reason is as follows. As described above, in the injection molding, because the process for removing the mold after the material $m_1$ such as the resin is poured into the mold and hardening the material is necessary, in the cross-sectional shapes of the grooves that can be formed, widths need to increase from bottoms of the grooves to the boundary surface. When the cross-sectional shape is the square shape, this corresponds to the case in which a width of the groove at the bottom and a width of the groove at the boundary surface are equal to each other and if the mold is not extracted carefully, the mold or the microchip may be damaged.

Therefore, in a configuration f of FIG. 2, a cross-sectional shape of each channel 2 provided in the microchip 1 made of the material $m_1$ is set to an isosceles trapezoidal shape. An upper base of an isosceles trapezoid is set to a part of the boundary surface 5, a lower base is set to a bottom of the groove provided in the component below the boundary surface 5 of the microchip, and width of upper base>width of lower base is set. In the case of this shape, the process for removing the mold in the processing method such as the injection molding is facilitated and the mass productivity can be increased. A portion more than 90 degrees in a base angle of the isosceles trapezoid is called a draft angle. That is, when the draft angle is set to D degrees, the base angle of the isosceles trapezoid becomes 90+D degrees. The draft angle D satisfies 0 degree<D<90 degrees and when D is large, the process for removing the mold is facilitated. However, the cross-sectional shapes of the individual channels are preferably equal to each other and D is preferably small. If processing precision is considered, D>2 degrees is preferably set.

However, if the laser beam 4 is incident on the microchip 1 having the configuration f along the side-entry axis, the laser beam 4 is deflected from the side-entry axis toward the opposite direction to the boundary surface 5, in FIG. 2, from the side-entry axis to the lower side, whenever the laser beam 4 passes through each channel 2. This phenomenon can be described as follows. The isosceles trapezoid to be the cross-sectional shape of each channel 2 can be regarded as a part of a cross-section of a prism of an isosceles triangle. However, because a refractive index of the prism, that is, the refractive index $n_2$ of the material $m_2$ filled in each channel 2 is smaller than a refractive index of a surrounding portion of the prism, that is, the refractive index $n_1$ of the material $m_1$ of the microchip 1, the laser beam 4 incident on the prism is refracted toward the opposite direction to the base of the isosceles triangle, that is, toward the side of the vertex angle of the prism.

Figure 3:
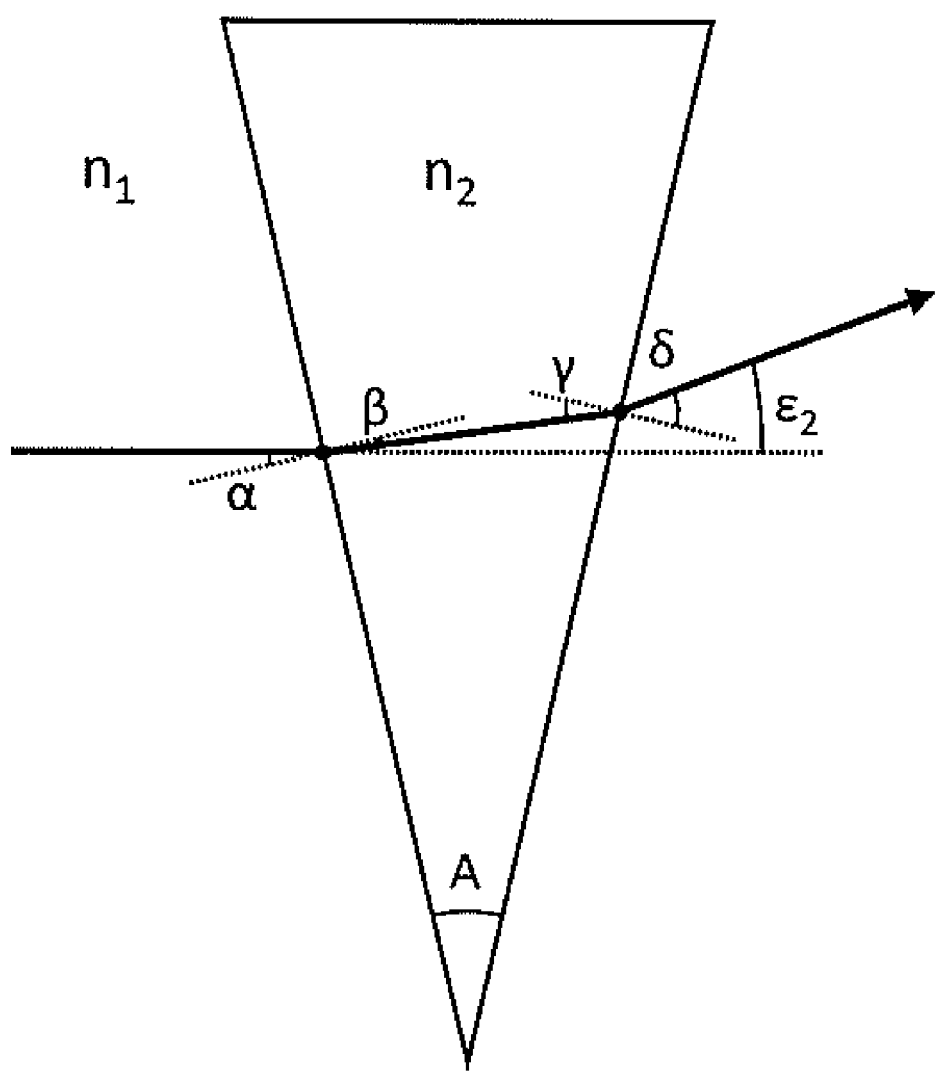
FIG. 3 is a diagram illustrating a definition of a refraction angle of a laser beam incident on a triangular prism.

FIG. 3 schematically illustrates the phenomenon for easy understanding. In the material $m_1$ having the refractive index $n_1$, a triangular prism made of the material $m_2$ having the refractive index $n_2$ and having a vertex angle A is positioned in a state in which a base is disposed horizontally and the vertex angle is downward. As defined in FIG. 3, an incidence angle and a refraction angle in an incidence surface when a laser beam having a width of zero virtually is horizontally incident on the prism are set to $\alpha$ and $\beta$, respectively, an incidence angle and a refraction angle in an emission surface are set to $\gamma$ and $\delta$, respectively, and a net refraction angle when the laser beam passes through the prism is set to $\varepsilon_2$. All of $\alpha$, $\beta$, $\gamma$, and $\delta$ take positive values between 0 degree and 90 degrees. However, $\varepsilon_2$ is in $-90$ degrees<$\varepsilon_2$<90 degrees and a sign is a positive sign when the laser beam is refracted to the side of the base like FIG. 3 and is a negative sign when the laser beam is refracted to the side of the vertex angle like the configuration f. In the case of FIG. 2, $\varepsilon_2$ is a refraction angle when the laser beam 4 passes through the channel 2. Here, the followings are derived from the Snell's law and a geometric relation.

$$n_1 * \sin \alpha = n_2 * \sin \beta \quad (1)$$

$$n_2 * \sin \gamma = n_1 * \sin \delta \quad (2)$$

$$\gamma = A - \beta \quad (3)$$

$$\varepsilon_2 = \alpha + \delta - A \quad (4)$$

In addition, if the draft angle of the injection molding is set to D, $$A = 2*D \quad (5)$$

is satisfied. Because the incident laser beam and the base are parallel to each other, $$\alpha = D \quad (6)$$

is satisfied. From the above, $$\varepsilon_2 = \sin^{-1}[\sin\{2*D - \sin^{-1}(\sin D*n_1/n_2)\}*n_2/n_1] - D \quad (7)$$

is represented. In the configuration f, because $n_2 < n_1$ is satisfied, the refraction angle becomes $\varepsilon_2 < 0$ and as described above, the laser beam 4 is refracted to the side of the vertex angle, in a direction separated from the side-entry axis, when the laser beam 4 passes through the channel 2. When the laser beam passes through the plurality of channels 2, the laser beam 4 deviates from the side-entry axis rapidly, because the refraction angle is integrated. Therefore, the configuration f is an inappropriate configuration for the side-entry method to irradiate the plurality of channels 2 at the same time.

To resolve the problem of the configuration f, in a configuration g of FIG. 2, the plurality of channels 2 filled with the material $m_2$ having the refractive index $n_2$ and the plurality of channels 3 filled with the material $m_3$ having the refractive index $n_3$ are alternately arranged in the microchip 1 made of the material $m_1$ and $n_2 < n_1 < n_3$ is satisfied, similar to the configurations b, c, and d illustrated in FIG. 1. Here, a refraction angle $\varepsilon_3$ when the laser beam 4 passes through the channel 3 is represented as $$\varepsilon_3 = \sin^{-1}[\sin\{2*D - \sin^{-1}(\sin D*n_1/n_3)\}*n_3/n_1] - D \quad (8)$$

by the same derivation as the refraction angle $\varepsilon_2$ when the laser beam 4 passes through the channel 2. Here, because $n_2 < n_1 < n_3$ is satisfied, $\varepsilon_3 > 0$ is satisfied in contrast to $\varepsilon_2 < 0$ and the channel 3 can refract the laser beam 4 in a direction opposite to a refraction direction of the channel 2, that is, the laser beam 4 refracted in the direction separated from the side-entry axis by the channel 2 can be refracted in a direction returning to the side-entry axis by the channel 3.

To cause the side-entry method to function surely, it is important to balance $\varepsilon_2$ and $\varepsilon_3$ and it is effective to decrease an absolute value of a net refraction angle by adding the channel 3 to the channel 2, that is, $$|\varepsilon_2 + \varepsilon_3| < |\varepsilon_2| \quad (9)$$

is effective relation. If the expressions (7) and (8) are substituted for the expression (9), $$|\sin^{-1}[\sin\{2*D - \sin^{-1}(\sin D*n_1/n_2)\}*n_2/n_1] - D + \sin^{-1}[\sin\{2*D - \sin^{-1}(\sin D*n_1/n_3)\}*n_3/n_1]| < |\sin^{-1}[\sin\{2*D - \sin^{-1}(\sin D*n_1/n_2)\}*n_2/n_1] - D| \quad (10)$$

is satisfied. More ideally, $$|\varepsilon_2 + \varepsilon_3| \approx 0 \quad (11)$$

is effective. Likewise, if the expressions (7) and (8) are substituted for the expression (11)

$$|\sin^{-1}[\sin\{2*D - \sin^{-1}(\sin D*n_1/n_2)\}*n_2/n_1] - D + \sin^{-1}[\sin\{2*D - \sin^{-1}(\sin D*n_1/n_3)\}*n_3/n_1] - D| \approx 0 \quad (12)$$

is satisfied. When these relations are satisfied, the laser beam 4 can be propagated along the side-entry axis and the plurality of channels 2 can be simultaneously irradiated efficiently by the side-entry method.

FIGS. 4(a) to 4(f) are process views illustrating processes for manufacturing the microchip 1 having the configuration g of FIG. 2 by the injection molding, by schematic cross-sectional views. As illustrated in FIG. 4(b), the material $m_1$ obtained by melting transparent resin by heating is injected into a mold 100 illustrated in 4(a) and is cooled and solidified. Next, the mold 100 is removed, so that a molded object of a transparent solid material functioning as a component 101 having grooves with trapezoidal cross-section on the upper surface as illustrated in FIG. 4(c), that is, the component 101 below the boundary surface 5 of the configuration g is obtained. These grooves are arranged in parallel to each other in at least a partial region.

Meanwhile, a plate-like transparent solid material functioning as a component 102 not having the grooves on the lower surface as illustrated in FIG. 4(d), that is, the component 102 on the boundary surface of the configuration g is manufactured separately, the component 102 is bounded to the component 101 by thermal welding at the boundary surface 5 as illustrated in FIG. 4(d), and the microchip 1 illustrated in FIG. 4(e) is obtained. That is, the channels of the microchip are configured by the plurality of grooves formed on the upper surface of the component 101, by these processes. In this state, all the channels are filled with air. Finally, as illustrated in FIG. 4(f), the materials $m_3$ are filled into desired channels in the plurality of channels and the channels 3 are manufactured. The microchip 1 is distributed to a user in a state of FIG. 4(f). Before the user starts analysis, the user fills the materials $m_2$ made of media for electrophoresis into the other channels to manufacture the channels 2 and obtains a state of the configuration (g). Of course, the microchip may be distributed to the user after the microchip is completed to the state of the configuration (g).

The case in which the cross-sectional shapes of the channels 2 and 3 are the isosceles trapezoidal shapes has been considered. However, the same consideration is enabled for the case in which the cross-sectional shapes are trapezoidal shapes, not the isosceles trapezoidal shapes. When two base angles of a trapezoid are set to $90 + D_L$ degrees (0 degree $< D_L <$ 90 degrees) and $90 + D_R$ degrees (0 degree $< D_R <$ 90 degrees), respectively, in the case in which $D = (D_L + D_R)/2$ is satisfied, the relational expressions from the expression (1) to the expression (12) may be applied approximately.

In addition, even when the cross-sectional shapes of the channels 2 and 3 are shapes other than the trapezoidal shapes, the same effect can be obtained. For example, even if the cross-sectional shape is a shape of a trapezoid other than the isosceles trapezoid, a shape of a parallelogram, a shape of a triangle, or a shape in which each side has a circular arc shape, not a linear shape, or a corner is round, refractions of the laser beam 4 by the channel 2 having the refractive index $n_2$ and by the channel 3 having the refractive index $n_3$, which are provided in the microchip 1 having the refractive index $n_1$, are opposite and are offset, so that a net refraction is weakened. This is a characteristic of the present invention and a representative condition thereof is $n_2 < n_1 < n_3$. In addition, the individual channels are arranged at the equal interval. However, even though the individual channels are not arranged at the equal interval, the same effect is obtained. In addition, in the configuration g, the channels 2 and 3 are arranged alternately. However, the channels 2 and 3 are not necessarily arranged alternately and at least one channel 2 and 3 need to be arranged on the same microchip. For example, when the refraction function of the two channels 2 and the refraction function of one channel 3 are offset with good balance, the channels 2 and 3 may be arranged at a ratio of 2:1 in numbers thereof.

Hereinafter, embodiments of the present invention will be described.

First Embodiment

Figure 5A:
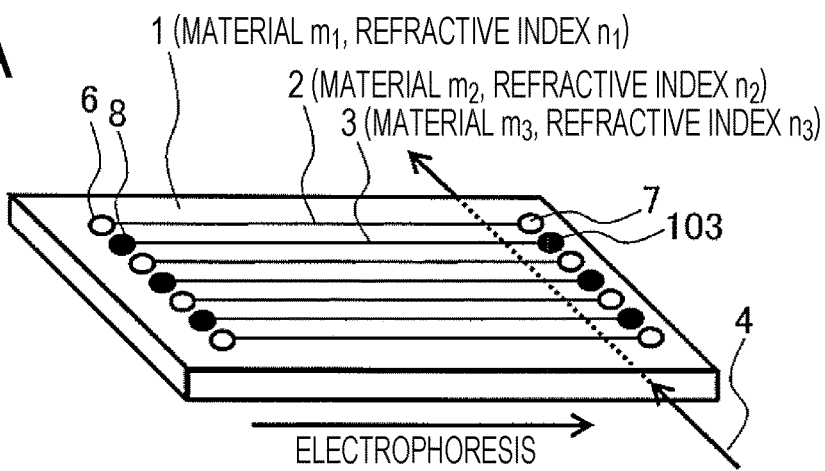
FIGS. 5A-5C are schematic views illustrating an example of a multichannel fluorescence detection system according to the present invention.
Figure 5B:
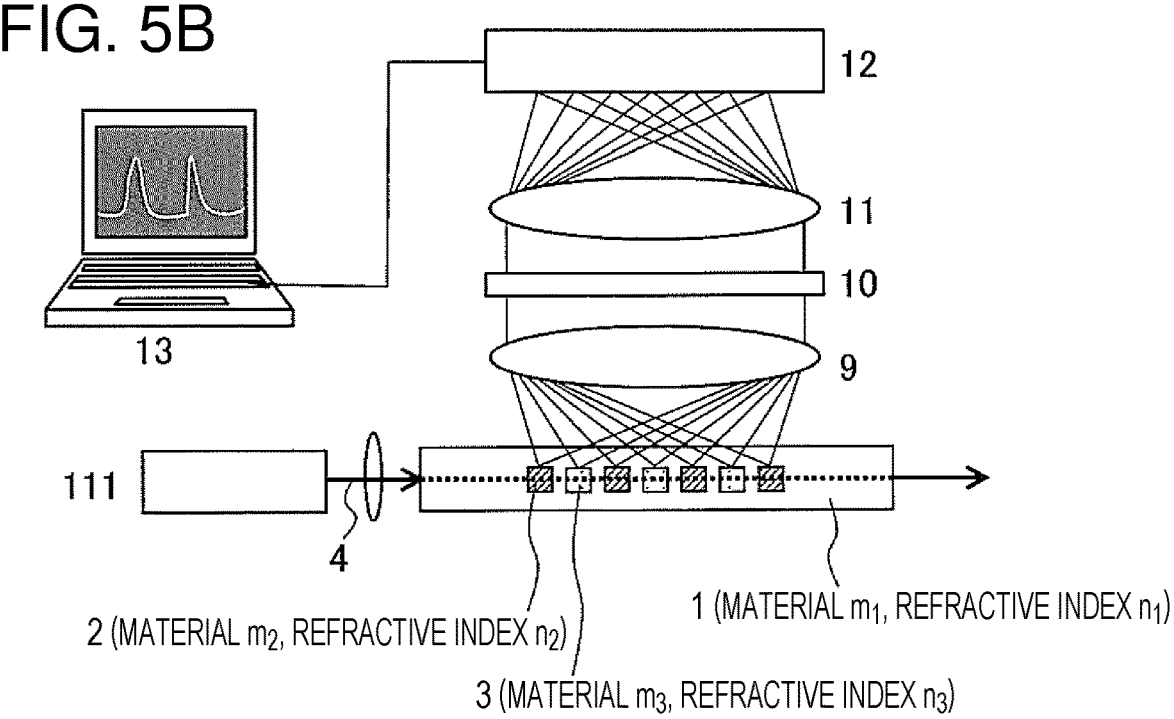
Figure 5C:
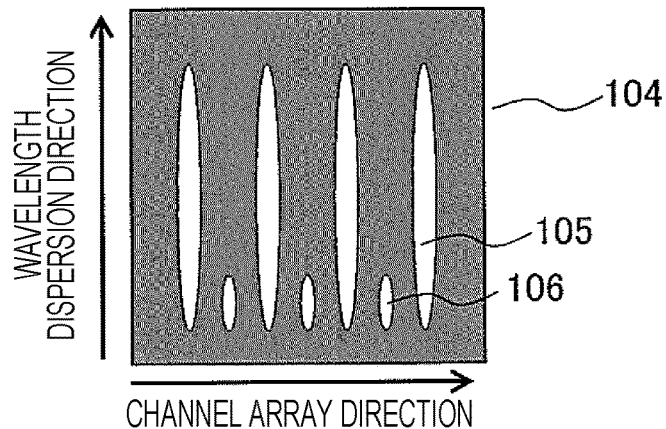

FIGS. 5(a) to 5(c) are schematic views illustrating an example of a multichannel fluorescence detection system according to the present invention. This example shows a system for performing electrophoresis analysis of DNA included in a biological sample. FIG. 5(a) illustrates a perspective view of a microchip 1, FIG. 5(b) illustrates a cross-section of the microchip 1 including a side-entry axis of a laser beam 4 and a cross-section of a fluorescence detection optical system, and FIG. 5(c) illustrates a two-dimensional fluorescence detection images obtained by a two-dimensional sensor 12.

As illustrated in FIG. 5(a), in the microchip 1, each channel 2 filled with a material $m_2$ and each channel 3 filled with a material $m_3$ are arranged alternately and in parallel to each other, on the same plane. An inlet port 6 and an outlet port 7 are provided in each channel 2. A cross injection portion or a T injection portion to introduce a sample is provided in a portion of each channel 2 in the vicinity of the inlet port 6. However, the cross injection portion or the T injection portion is not illustrated in FIG. 5(a). In the DNA of the sample, an interesting region is previously amplified and is labeled with a fluorescent dye. After the sample is introduced to channels 2 through the cross injection portions, the inlet port 6 is set to a negative electrode, the outlet port 7 is set to a positive electrode, and a voltage is applied to both ends of each channel 2, so that the fluorescently labeled DNA included in the sample is migrated from the inlet port 6 to the outlet port 7.

Figure 6A:
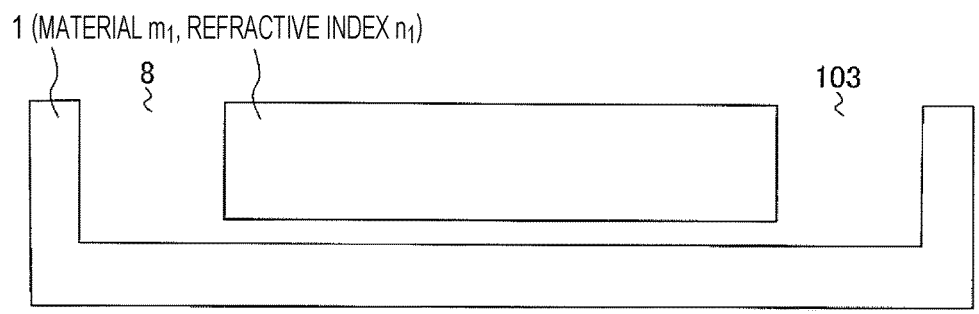
FIGS. 6A-6C are schematic cross-sectional views illustrating a both-end sealing method of a channel filled with a material $m_3$.
Figure 6B:
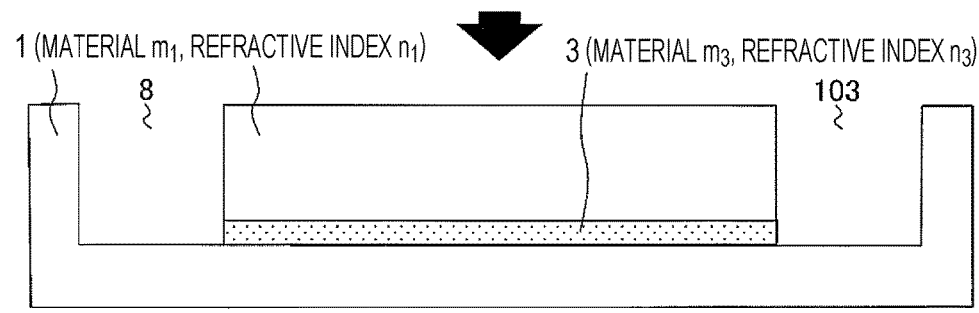
Figure 6C:
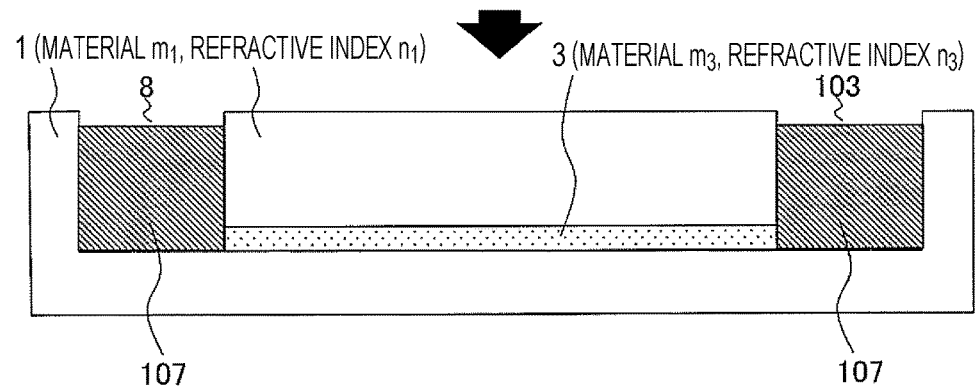

Meanwhile, an inlet port 8 and an outlet port 103 are provided in each channel 3. When a material $m_3$ filled into each channel 3 is a solid, the inlet port 8 or the outlet port 103 may be opened. However, when the material is a liquid, a mechanism for preventing the material $m_3$ from being removed from the channel 3 by evaporation or a pressure difference is necessary. Here, the material $m_3$ is filled into the channel 3 and the inlet port 8 and the outlet port 103 are then sealed. FIGS. 6(a) to 6(c) are schematic cross-sectional views of the microchip 1 along one channel 3 of FIG. 5(a). As illustrated in FIG. 6(a), first, the inlet port 8, the channel 3, and the outlet port 103 are filled with air. Next, as illustrated in FIG. 6(b), the channel 3 is filled with the material $m_3$. Finally, as illustrated in FIG. 6(c), a rubber plug 107 made of silicon is inserted into each of the inlet port 8 and the outlet port 103 to prevent the material $m_3$ in the channel 3 from moving. Here, even if the inlet port 8 and the outlet port 103 are fixed by an adhesive agent or resin instead of the rubber plug, the same effect can be obtained. Preferably, an internal space of the channel 3 of which both ends are sealed by the rubber plugs 107 is filled with only the material $m_3$ and air is not mixed. However, if a small amount of air is mixed, the movement of the material $m_3$ is suppressed and at least a laser-beam irradiation position of the channel 3 can be controlled such that the channel 3 is filled with the material $m_3$ at all times during measurement.

As illustrated in FIG. 5(b), the laser beam 4 emitted from a laser light source 111 is focused by a lens, is introduced from a side surface of the microchip 1, and is irradiated to a portion where the individual channels 2 and 3 are arranged, along an array plane and a side-entry axis and vertically to long axes of the individual channels 2 and 3, to cause the laser beam 4 to pass through the individual channels 2 and 3, so that the individual channels 2 and 3 are simultaneously irradiated. At the time of crossing the side-entry axis, the fluorescently labeled DNA electrophoretically migrating in each channel 2 is excited by the laser beam and emits fluorescence. The fluorescence emitted from each channel 2 is detected by the fluorescence detection optical system. That is, the fluorescence is collimated into a parallel light flux by a common collimating lens 9, transmits a filter and a diffraction grating 10, and forms an image on a sensor surface of a two-dimensional sensor 12 by an imaging lens 11. The filter is provided to block a wavelength of a laser beam becoming background light for fluorescence detection and the diffraction grating is provided to perform wavelength dispersion of the fluorescence and perform multicolor detection. The channels 2 and 3 perform the same optical functions at positions of a wide range of long axis directions of the channels. For this reason, even if an incidence position of the laser beam 4 on the microchip 1 is slightly shifted, this does not affect fluorescence detection precision.

FIG. 5(c) is a schematic diagram illustrating a two-dimensional fluorescence detection images 104 obtained by the two-dimensional sensor 12. Because a direction of the wavelength dispersion is parallel to the long axis direction of each channel 2, that is, vertical to an array direction of the plurality of channels 2, wavelength dispersion images of the fluorescence emitted from the individual channels 2 are measured independently without overlapping each other. Here, wavelength dispersion images 105 of fluorescence and laser-beam scattering not removed by the filter are obtained from each channel 2 and wavelength dispersion images 106 of laser-beam scattering not removed by the filter are obtained from each channel 3. A signal of the fluorescence measured as described above is analyzed by a data analysis system 13 and the sample introduced into each channel 2 is analyzed.

Figure 7:
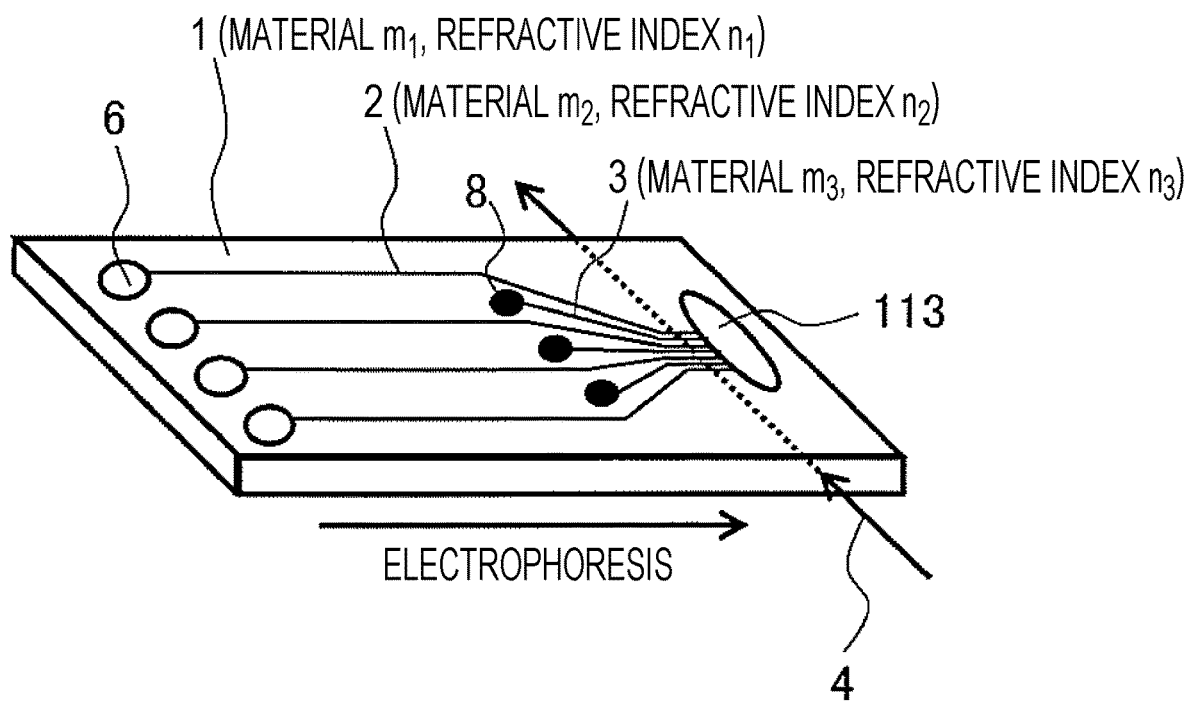
FIG. 7 is a schematic diagram illustrating a configuration example of a microchip.

FIG. 7 is a schematic diagram illustrating a configuration example of the microchip 1 different from FIG. 5(a). These are the same in that the plurality of channels 2 and 3 are alternately arranged. However, these are different in that an array interval decreases in the vicinity of a laser-beam irradiation position and a common outlet port 113 exists in the individual channels 2 and 3. This is because a space to configure a sample introduction mechanism including the inlet port 6 and the cross injection portion independently for each channel 2 is necessary at a sample introduction side, but decreasing the array interval at the laser-beam irradiation position is advantageous to a side-entry method. Here, because the common outlet port 113 exists at the downstream side of the laser-beam irradiation position in the electrophoresis analysis, the common outlet port does not affect electrophoresis analysis. The reason why an entire length of the channel 3 is shorter than an entire length of the channel 2 is that the channel 3 may exist at only the laser-beam irradiation position.

FIGS. 5(a) to 5(c) illustrate a part of an embodiment common to the present invention. However, in some embodiment, the channel 3 illustrated in FIGS. 5(a) and 5(b) may not exist. However, in this case, it may be assumed that the channel 3, the inlet port 8, and the outlet port 103 are removed from FIGS. 5(a) and 5(b). In addition, the number or the cross-sectional shape of each of the channels 2 and 3 is only exemplary and the present invention is not limited thereto.

In the present invention, to demonstrate an effect thereof, laser-beam tracking simulations of the side-entry laser-beam irradiation on the plurality of channels provided in the microchip is performed, a ratio of strength of the laser beam passing through each channel to total strength of the laser beam before being incident on a microchip, that is, laser-beam irradiation efficiency of each channel is acquired, and a relation of a channel number and efficiency is evaluated. It is proved that the laser-beam irradiation efficiency of each channel acquired from the laser-beam tracking simulations is well matched with a fluorescence strength ratio of each channel obtained by an experiment, as described in PTL 2, and this is an evaluation method having high reliability. In the present invention, illumination design analysis software LightTool™ (Synopsys' Optical Solutions Group) is used as a three-dimensional laser-beam tracking simulator.

FIGS. 8(a) to 8(e) are diagrams illustrating a configuration a to be a form of the microchip 1 according to the present invention and laser-beam tracking simulation results of the side-entry laser-beam irradiation thereon.

FIG. 8(a) is a diagram illustrating a cross-section including the side-entry axis of the microchip 1 and vertical to each channel 2. A total of 24 channels 2 from #1 to #24 are arranged on the same plane. Here, #1 exists at an end of the side where the laser beam 4 is introduced and shows a number of the channel 2 to which the laser beam 4 is first irradiated. Hereinafter, #2, #3, . . . , and #24 show numbers sequentially given to the individual channels 2 according to a propagation direction of the laser beam 4. FIG. 8(b) is an enlarged view of a portion from #1 to #4 in FIG. 8(a). FIGS. 8(a) to 8(e) are illustrated by a yz plane including y and z axes. However, an original point thereof is matched with a center axis of #1 and the z axis is matched with the side-entry axis.

The configuration of the microchip 1 illustrated in FIGS. 8(a) to 8(e) follows the configuration a of FIG. 1. The microchip 1 is arranged in the air. The material $m_1$ of the microchip 1 is ZEONOR™ (Zeon Corporation). ZEONOR™ is a cycloolefin polymer (COP) resin and is used well for the material of the microchip due to characteristics that transparency is high and moisture absorbency is low. A refractive index of ZEONOR™ is $n_1$=1.53. A cross-sectional shape of the channel 2 is a shape of a circle having a diameter of 50 μm and 24 channels 2 are arranged on the same plane at an interval of 300 μm. That is, a distance of the center axis of #1 and the center axis of #24 is 6.9 mm. Each channel 2 is filled with 3500/3500xL POP-7™ polymer (Life Technologies). POP-7 is an aqueous solution containing urea of 8M and a polymer for an electrophoresis separation medium and a refractive index thereof is $n_2$=1.41 under an influence of urea of 8M.

FIGS. 8(c) and 8(d) are diagrams illustrating results of the laser-beam tracking simulations of the side-entry laser-beam irradiation in FIGS. 8(a) and 8(b), respectively. The laser beam 4 is introduced from the left side of FIGS. 8(a) to 8(d), is incident on a left side surface of the microchip 1, and is irradiated to the channel 2 of #1. The laser beam 4 before being incident on the microchip 1 is a parallel laser beam having a wavelength of 505 nm and a diameter of 50 μm and a center axis thereof is matched with the side-entry axis. In addition, the laser beam 4 is composed of 300 beam elements having an infinitely small width and positions of the beam elements are arranged uniformly and randomly in in the 50 μm-diameter cross-sectional area. The total strength of the laser beam 4 is set to 1.0 and each beam element has the same strength of 1/300. In the laser-beam tracking simulation, the Snell's law and the Fresnel's law are applied to each beam element at positions where refractive indexes change, such as an incidence surface on the microchip 1, an incidence surface on the channel 1, and an emission surface from the channel 1, and a propagation direction and strength of refracted light are tracked. However, when the beam element is totally reflected at the position where the refractive index changes, a propagation direction and strength of reflected light are tracked. FIGS. 8(c) and 8(d) illustrate optical paths of the 300 beam elements calculated as described above. FIG. 8(e) illustrates laser-beam irradiation efficiency. It is obtained by that the beam elements transmitting each channel are extracted for each channel and that a total of strength at the positions thereof is calculated.

As illustrated in FIGS. 8(c) and 8(d), because each channel 2 has a concave lens function by $n_2$ (=1.41)<$n_1$ (=1.53), the laser beam 4 is diverged from the side-entry axis. As illustrated in FIG. 8(e), the laser-beam irradiation efficiency is rapidly decreased and the laser-beam irradiation is enabled for only one or two channels. Therefore, it becomes clear that the configuration a of the microchip of this example illustrated in FIGS. 8(a) to 8(e) is not suitable for the case in which the multiple channels 2 are simultaneously irradiated efficiently by the side-entry method.

The laser-beam tracking simulations described above are executed on a three-dimensional model. However, FIGS. 8(a) to 8(d) are two-dimensional images projected on a plane vertical to the center axis of each channel 2. FIG. 8(e) illustrates three-dimensionally calculated results.

Figure 9A:
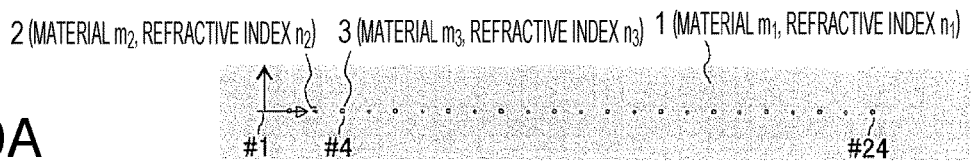
FIGS. 9A-9E are diagrams illustrating a microchip configuration b and laser-beam tracking simulation results of a side-entry laser-beam irradiation.
Figure 9B:
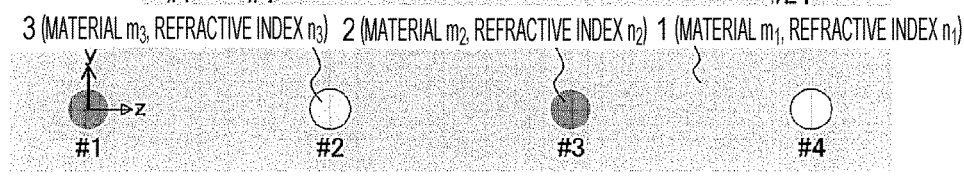

FIGS. 9(a) to 9(e) are diagrams illustrating a configuration b to be a form of the microchip 1 according to the present invention and results of laser-beam tracking simulations of the side-entry laser-beam irradiation thereon. The configuration of the microchip 1 follows the configuration b of FIG. 1. Hereinafter, the configuration b is described. However, it may be thought that the same description as the configuration a is realized unless otherwise specified. A difference of the configurations b and a is that odd numbers # and even numbers # in the 24 channels are set to the channels 2 and the channels 3, respectively, and the channels 2 and 3 are alternately arranged, as illustrated in FIGS. 9(a) and 9(b). Here, in FIGS. 9(a) and 9(b), the channels 3 are outlined to easily view the channels 3.

The material $m_1$ of the microchip 1 and the material $m_2$ filled into the channel 2 are equal to the materials in the configuration a. The material $m_3$ filled into the channel 3 is a standard refraction liquid having a refractive index of $n_3$=1.60 in a Standard Group Combined Set (MORITEX). The Standard Group Combined Set is commercially available with a step of 0.002 and clearance of ±0.0002, in a refractive index range of 1.400 to 1.700. After the standard refraction liquid is filled into the channel 3, both ends of the channel 3 are sealed, so that the standard refraction liquid is prevented from being removed from the channel 3 by the evaporation or the pressure. In this way, the microchip in which the standard refraction liquid is previously filled into the channel 3 can be distributed in the market and a user can remove trouble to fill the standard refraction liquid into the channel 3. Here, a relation of $n_2$ (=1.41)<$n_1$ (=1.53)<$n_3$ (=1.60) is satisfied and each channel 2 shows a concave lens function and each channel 3 shows a convex lens function.

Figure 9C:
Figure 9D:
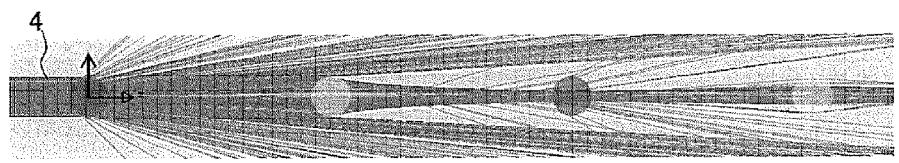

As illustrated in FIGS. 9(c) and 9(d), it is possible to cause a part of the laser beam 4 to transmit the multiple channels 2 and 3 along the side-entry axis without being diverged from the side-entry axis, different from FIGS. 8(c) and 8(d). This is because the laser beam 4 spread by the concave lens function of the channel 2 is condensed partially by the convex lens function of the channel 3. However, there are beam elements that are spread by the channel 2 of #1, are not incident on the channel 3 of #2, and are continuously diverged.

Figure 9E:
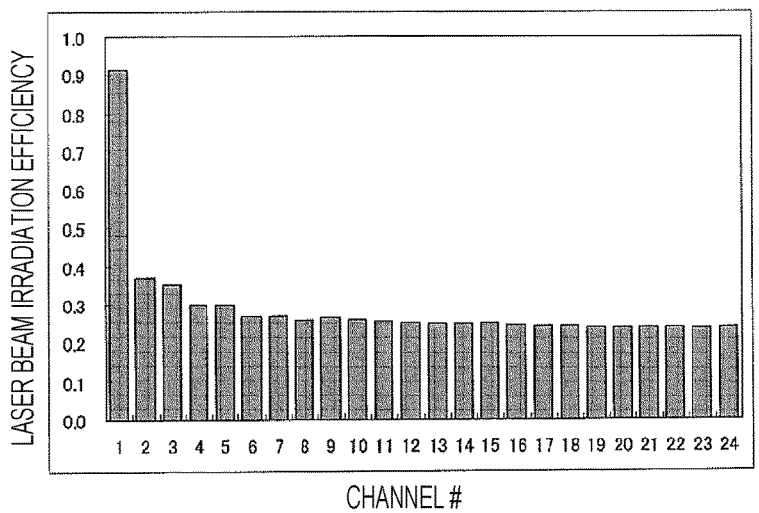

As a result, as illustrated in FIG. 9(e), the laser-beam irradiation efficiency decreases rapidly from the channel 1 of #1 to the channel 3 of #2. However, reduction becomes very small to the channel 3 of #24. The change in the laser-beam irradiation efficiency is the same as the change in FIG. 8(e) from #1 to #2, but is greatly different from the change in FIG. 8(e) from #3 to #24. Because the laser-beam irradiation efficiency of #24 of FIG. 9(e) is more than 20%, it is experientially known that the fluorescence detection sensitivity slightly decreases, but the simultaneous fluorescence detection and the simultaneous electrophoresis analysis using the 12 channels 2 of the odd numbers # are enabled. The laser-beam irradiation efficiency on channel 2 of #1 is greatly different from that on channel 3 of #2 and the following channels 2 and 3. However, even if there is such difference, the different samples can be analyzed simultaneously using the plurality of channels. However, when the fluorescence strengths are compared between the channels or quantitativeness is acquired in the fluorescence strength, the laser-beam strengths between the channels are preferably arranged. In this case, the channels 2 after #3 may be used for the analysis, without using #1 for the analysis.

Figure 10A:
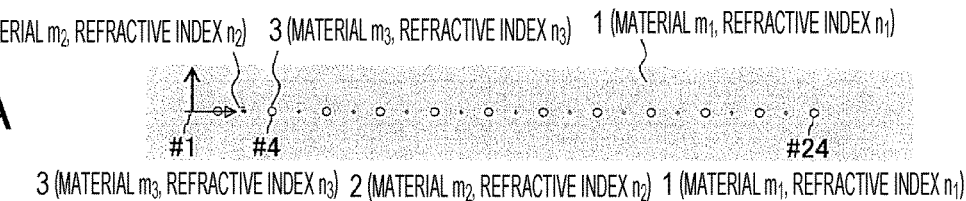
FIGS. 10(a) to 10(e) FIGS. 10A-10E are diagrams illustrating a microchip configuration c and laser-beam tracking simulation results of a side-entry laser-beam irradiation.
Figure 10B:
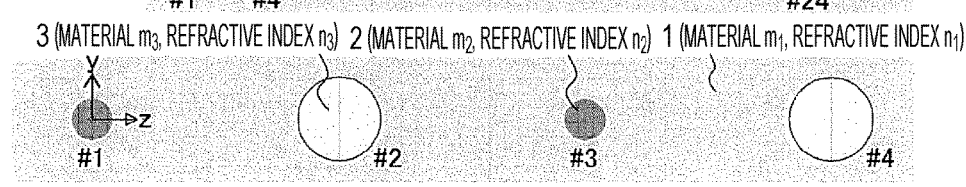

FIGS. 10(a) to 10(e) are diagrams illustrating a configuration c to be a form of the microchip 1 according to the present invention and results of laser-beam tracking simulations of the side-entry laser-beam irradiation thereon. The configuration of the microchip 1 follows the configuration c of FIG. 1. Hereinafter, the configuration c is described. However, it may be thought that the same description as the configuration b is realized unless otherwise specified. A difference of the configurations c and b is that a cross-sectional shape of each of the channels 3 of odd numbers # is set to a shape of a circle having a double diameter 100 µm, as illustrated in FIGS. 10(a) and 10(b). Here, in FIGS. 10(a) and 10(b), the channels 3 are outlined to easily view the channels 3.

The material $m_3$ filled into each channel 3 is a standard refraction liquid having a refractive index of $n_3=1.68$ in the same Standard Group Combined Set. The reason why the diameter of the circle of the cross-section of the channel 3 is increased is to reduce a ratio of beam elements spread not to be incident on the channel 3 of #2 in the laser beam 4 diverged by the channel 2 of #1, in FIGS. 9(c) and 9(d). Meanwhile, increasing the diameter of the circle of the cross-section of the channel 3 means that a curvature of a surface of the channel 3 decreases, that is, the convex lens function is weakened. Therefore, the internal refractive index is set high as compared with the case of the configuration b, so that the convex lens function of the channel 3 is maintained. A relation of $n_2$ (=1.41)<$n_1$ (=1.53)<$n_3$ (=1.68) is satisfied and the concave lens function of each channel 2 and the convex lens function of each channel 3 are balanced.

Figure 10C:
Figure 10D:
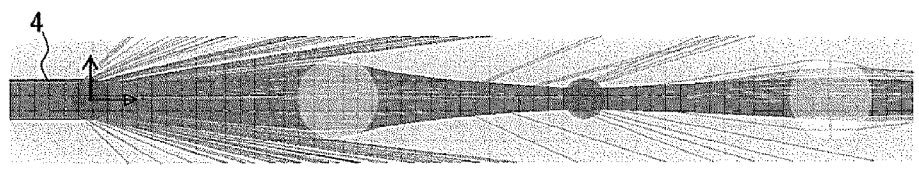
Figure 10E:
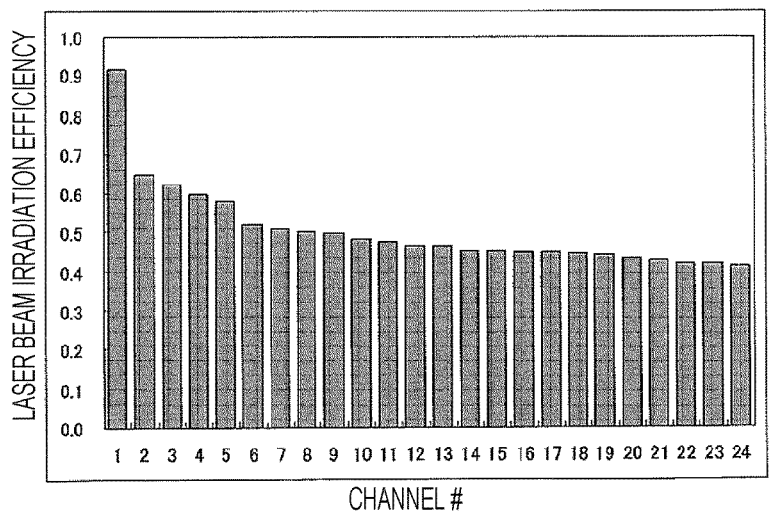

As illustrated in FIGS. 10(c) and 10(d), it is possible to cause a large part of the laser beam 4 to transmit the multiple channels 2 and 3 along the side-entry axis without being diverged from the side-entry axis, different from FIGS. 9(c) and 9(d). This is because the laser beam 4 spread by the concave lens function of the channel 2 is condensed more efficiently by the convex lens function of the channel 3 having the large cross-section. As a result, as illustrated in FIG. 10(e), reduction of the laser-beam irradiation efficiency from the channel 2 of #1 to the channel 3 of #2 is greatly suppressed as compared with FIG. 9(e) and reduction to the channel 3 of #24 is also maintained very small. As a whole, the laser-beam irradiation efficiency is improved to about twice the laser-beam irradiation efficiency of the case of FIG. 9(e). From this, it is known that the simultaneous fluorescence detection and the simultaneous electrophoresis analysis using the 12 channels 2 of the odd numbers # are enabled.

FIGS. 11(a) to 11(e) are diagrams illustrating a configuration d to be a form of the microchip 1 according to the present invention and results of laser-beam tracking simulations of the side-entry laser-beam irradiation thereon. The configuration of the microchip 1 follows the configuration d of FIG. 1. Hereinafter, the configuration d is described. However, it may be thought that the same description as the configuration c is realized unless otherwise specified. A difference of the configurations d and c is that a cross-sectional shape of each of the channels 2 of odd numbers # is changed from a shape of a circle having a diameter of 50 µm to a shape of an isosceles trapezoid, as illustrated in FIGS. 11(a) and 11(b). The isosceles trapezoid has a lower base of 50 µm, a height of 50 µm, a base angle of 92 degrees, and an upper base of about 53.5 µm. Here, in FIGS. 11(a) and 11(b), the channels 3 are outlined to easily view the channels 3.

The reason why the cross-sectional shape is set to the rectangular shape is to weaken a refraction function of each channel 2. However, the reason why the cross-sectional shape is set to the shape of the isosceles trapezoid among the rectangles is to improve mass productivity of the microchip 1, as described in a configuration f of FIG. 13 later. The material $m_2$ filled into each channel 2 is equal to the material in the configuration c. However, the material $m_3$ filled into each channel 3 is a standard refraction liquid having a refractive index of $n_3=1.66$ in the same Standard Group Combined Set. The reason why the refractive index $n_3$ of the material $m_3$ filled into each channel 3 is slightly lowered as compared with the configuration c is that it is thought that the laser beam 4 can be condensed surely even though the convex lens function is lowered as compared with each channel 3 of the configuration c. A relation of $n_2$ (=1.41)<$n_1$ (=1.53)<$n_3$ (=1.66) is satisfied and the refraction function of each channel 2 and the convex lens function of each channel 3 are balanced.

As illustrated in FIGS. 11(c) and 11(d), it is possible to cause all beam elements of the laser beam 4 to transmit the multiple channels 2 and 3 along the side-entry axis without being diverged from the side-entry axis, different from FIGS. 10(c) and 10(d). This is because the refraction function of the channel 2 is weak and the convex lens function of the channel 3 having the large cross-section condenses the laser beam 4 efficiently.

As a result, as illustrated in FIG. 11(e), high laser-beam irradiation efficiency of 85% or more can be obtained in all of the channels 2 and 3 from #1 to #24. Because all beam elements of the laser beam 4 can be used, slight reduction of the laser-beam irradiation efficiency according to the channels # is described by reflection loss of the laser beam 4 at a boundary of the material $m_1$ of the microchip 1 and the material $m_2$ of each channel 2 or the material $m_3$ of each channel 3. In addition, the reason why the laser-beam irradiation efficiency of #1 becomes about 95% is that the reflection loss occurs when the laser beam 4 is incident on the microchip 1. From this, it is known that the simultaneous fluorescence detection and the simultaneous electrophoresis analysis using the 12 channels 2 of the odd numbers # are enabled with high sensitivity.

Second Embodiment

In this embodiment, description is given on the basis of a difference with the first embodiment and it may be thought that the same description as the first embodiment is realized unless otherwise specified. The basic difference with the first embodiment is that a cross-sectional shape of each channel is set to a rectangular shape, not a circular shape.

Figure 12A:
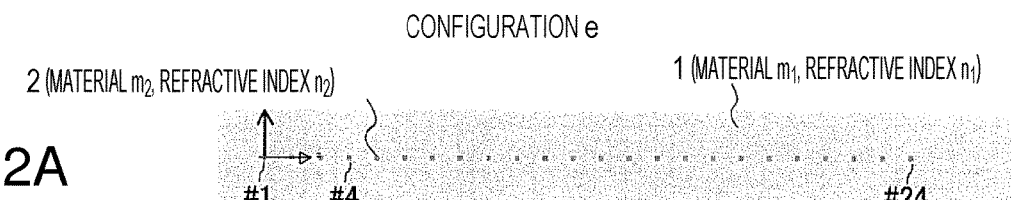
FIGS. 12A-12E are diagrams illustrating a microchip configuration e and laser-beam tracking simulation results of a side-entry laser-beam irradiation.
Figure 12B:
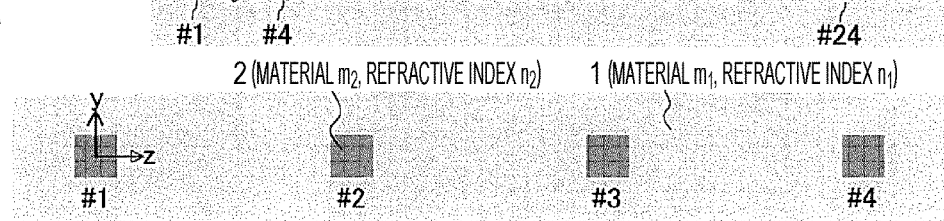

FIGS. 12(a) to 12(e) are diagrams illustrating a configuration e to be a form of the microchip 1 according to the present invention and results of laser-beam tracking simulations of the side-entry laser-beam irradiation thereon. The configuration of the microchip 1 follows the configuration e of FIG. 2. As illustrated in FIGS. 12(a) and 12(b), all channels from #1 to #24 are set to channels 2, a cross-sectional shape is set to a shape of a square having a diameter (width) of 50 µm, and 24 channels 2 are arranged on the same plane at an interval of 300 µm. Similar to the first embodiment, a material $m_1$ of the microchip 1 is ZEONOR™ ($n_1$=1.53) and a material $m_2$ filled into each channel 2 is 3500/3500xL POP-7™ polymer ($n_2$=1.41).

Figure 12C:
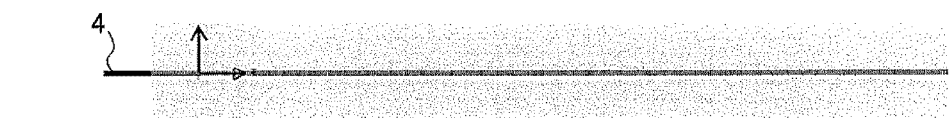
Figure 12D:
Figure 12E:
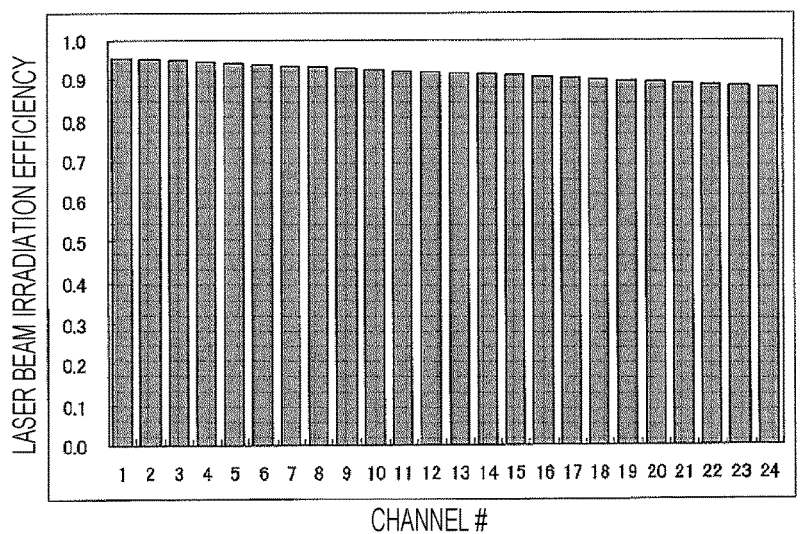

As illustrated in FIGS. 12(c) and 12(d), the laser beam 4 propagates linearly along a side-entry axis without being refracted by each channel 2. The reason is as follows. Because the cross-sectional shape of each channel 2 is the square shape, upper and lower sides are parallel to the side-entry axis, and left and right sides are vertical to the side-entry axis, an incidence angle and an emission angle of the laser beam 4 for each channel 2 become a right angle at all times and the laser beam 4 is not refracted. Because all of 300 beam elements configuring the laser beam 4 contribute to irradiation of all of the channels 2, as illustrated in FIG. 12(e), high laser-beam irradiation efficiency of 85% or more can be obtained in all of the channels 2 from #1 to #24. Results of FIG. 12(e) is almost equal to the results of FIG. 11(e) and even in any case, an ideal side-entry method of the laser beam 4 can be realized. In the configuration e, because all channels from #1 to #24 are the channels 2, it is known that simultaneous fluorescence detection and simultaneous electrophoresis analysis using the 24 channels 2 are enabled with high sensitivity.

FIGS. 13(a) to 13(e) are diagrams illustrating a configuration f to be a form of the microchip 1 and results of laser-beam tracking simulations of the side-entry laser-beam irradiation thereon. The configuration of the microchip 1 follows the configuration f of FIG. 2. Hereinafter, the configuration f is described. However, it may be thought that the same description as the configuration e is realized unless otherwise specified.

Figures 13A, 13B, 13C, 13D, 13E:
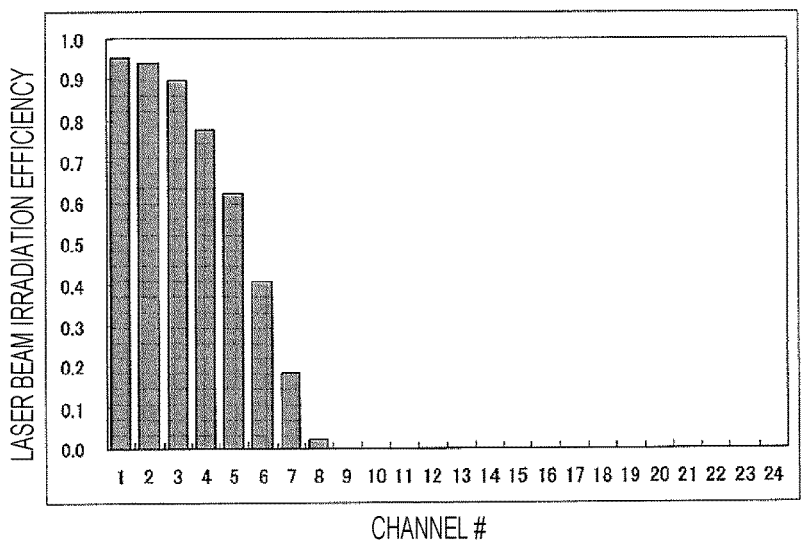
FIGS. 13A-13E are diagrams illustrating a microchip configuration f and laser-beam tracking simulation results of a side-entry laser-beam irradiation.

A difference of the configuration f and the configuration e is that a cross-sectional shape of each channel 2 is changed from a square shape to an isosceles trapezoidal shape, as illustrated in FIGS. 13(a) and 13(b). This change is made to improve mass productivity of a microchip 1, specifically, to manufacture the microchip 1 easily by a processing method such as injection molding. A material $m_1$ of the microchip 1 and a material $m_2$ filled into each channel 2 are equal to the materials in the configuration e. An isosceles trapezoid has a lower base of 50 µm, a height of 50 µm, a base angle of 92 degrees, and an upper base of about 53.5 µm. That is, a draft angle when grooves of the isosceles trapezoid are manufactured by the injection molding is 2 degrees. Here, a refraction angle of the laser beam 4 by the channel 2 is calculated as $\varepsilon_2$=−0.31 degrees by the expression (7) and the laser beam 4 is refracted downward from a side-entry axis in FIGS. 13(c) and 13(d).

As illustrated in FIGS. 13(c) and 13(d), when the laser beam 4 passes through each channel 2, the laser beam 4 is gradually deflected downward from the side-entry axis and is rapidly deviated from the side-entry axis. This is because a refraction function by each channel 2 is accumulated according to the number of channels 2 through which the laser beam 4 passes. After the channel 2 of #9, the laser beam 4 is completely deviated from an array of the channels 2. As illustrated in FIG. 13(e), laser-beam irradiation efficiency is rapidly reduced after the channel 2 of #4 and becomes zero after the channel 2 of #9. According to the configuration f, it is known that the number of channels 2 simultaneously irradiated with the laser beam 4 efficiently by the side-entry method is only 6 or 7.

FIGS. 14(a) to 14(e) are diagrams illustrating a configuration f' to be a form of the microchip 1 and results of laser-beam tracking simulations of the side-entry laser-beam irradiation thereon. The configuration f' of the microchip 1 follows the configuration f of FIG. 2. Hereinafter, the configuration f' is described. However, it may be thought that the same description as the configuration f is realized unless otherwise specified.

A difference of the configuration f' and the configuration f is only a cross-sectional shape of each channel 2. The cross-sectional shape of each channel 2 of the configuration f' is an isosceles trapezoidal shape and an isosceles trapezoid has a lower base of 50 µm, a height of 50 µm, a base angle of 94 degrees, and an upper base of about 57.0 µm. That is, a draft angle when grooves of the isosceles trapezoid are manufactured by the injection molding is 4 degrees. The reason why the draft angle of the configuration f' is increased to twice the draft angle of the configuration f is to improve mass productivity by the processing method such as the injection molding. Here, a refraction angle of the laser beam 4 by the channel 2 is calculated as $\varepsilon_2$=−0.63 degrees by the expression (7) and in FIGS. 14(c) and 14(d), the laser beam 4 is refracted downward from a side-entry axis and the magnitude thereof is about twice the magnitude of the case of the configuration f.

Figure 14A:
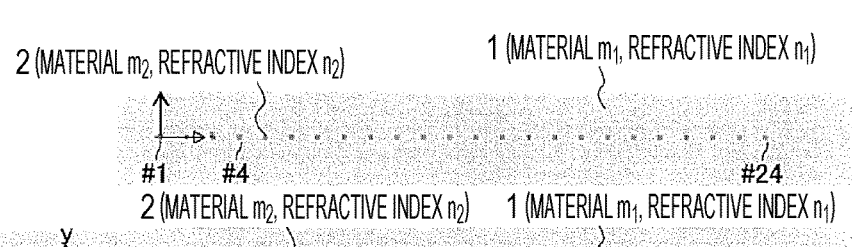
FIGS. 14A-14E are diagrams illustrating a microchip configuration f and laser-beam tracking simulation results of a side-entry laser-beam irradiation.
Figure 14B:
Figure 14C:
Figure 14D:
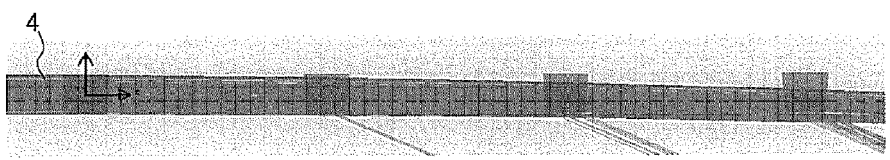
Figure 14E:
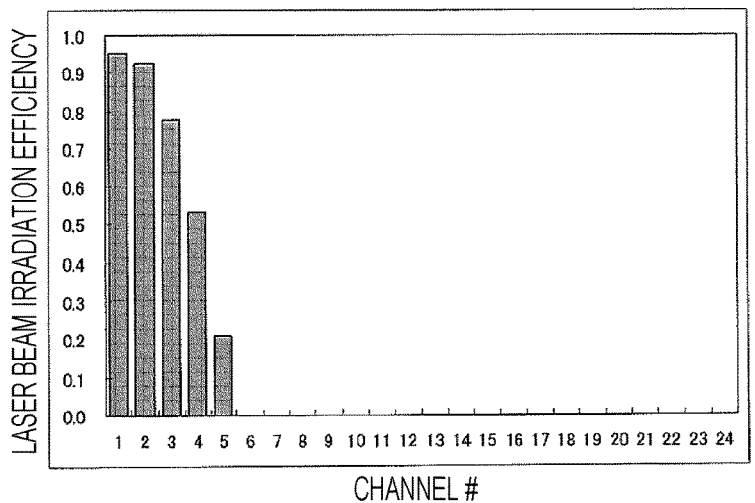

As illustrated in FIGS. 14(c) and 14(d), when the laser beam 4 passes through each channel 2, the laser beam 4 is more deflected downward from the side-entry axis than the case of FIGS. 13(c) and 13(d) and is rapidly deviated from the side-entry axis. This is because a refraction angle of each channel 2 of the configuration f' is larger than the refraction angle of each channel 2 of the configuration f After the channel 2 of #6, the laser beam 4 is completely deviated from an array of the channels 2. As illustrated in FIG. 14(e), laser-beam irradiation efficiency is rapidly reduced after the channel 2 of #4 and becomes zero after the channel 2 of #6. According to the configuration f', it is known that the number of channels 2 simultaneously irradiated with the laser beam 4 efficiently by the side-entry method is only 4 or 5.

Figure 15A:
Figure 15B:

FIGS. 15(a) to 15(e) are diagrams illustrating a configuration g to be a form of the microchip 1 and results of laser-beam tracking simulations of the side-entry laser-beam irradiation thereon. The configuration of the microchip 1 follows the configuration g of FIG. 2. Hereinafter, the configuration g is described. However, it may be thought that the same description as the configuration f is realized unless otherwise specified. A difference of the configuration g and the configuration f is that odd numbers # and even numbers # in 24 channels are set to the channels 2 and the channels 3, respectively, and the channels 2 and the channels 3 are alternately arranged, as illustrated in FIGS. 15(a) and 15(b). Here, in FIGS. 15(a) and 15(b), the channels 3 are outlined to easily view the channels 3.

The material $m_1$ of the microchip 1 and the material $m_2$ filled into the channel 2 are equal to the materials in the configuration f. The material $m_3$ filled into the channel 3 is a standard refraction liquid having a refractive index of $n_3=1.66$ in a Standard Group Combined Set. After the standard refraction liquid is filled into the channel 3, both ends of the channel 3 are sealed, so that the standard refraction liquid is prevented from being removed from the channel 3 by the evaporation or the pressure. Here, a relation of $n_2$ (=1.41)<$n_1$ (=1.53)<$n_3$ (=1.66) is satisfied and the refraction function of each channel 2 and the refraction function of each channel 3 are balanced. A refraction angle of the laser beam 4 by the channel 2 is calculated as $\varepsilon_2=-0.31$ degrees by the expression (7), but a refraction angle of the laser beam 4 by the channel 3 is calculated as $\varepsilon_3=0.34$ degrees by the expression (8). Therefore, $\varepsilon_2+\varepsilon_3=0.03$ degrees is realized and the expression (9) is satisfied. That is, the magnitude of the net refraction angle of the laser beam 4 by a set of channels 2 and 3 is smaller than the magnitude of the refraction angle of the laser beam 4 by only the channel 2.

Figure 15C:
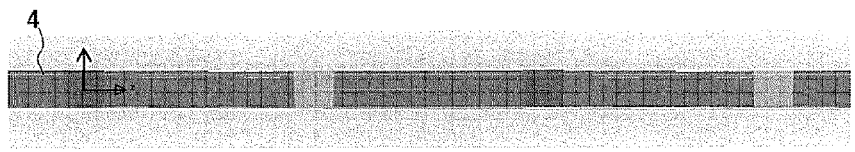
Figure 15E:
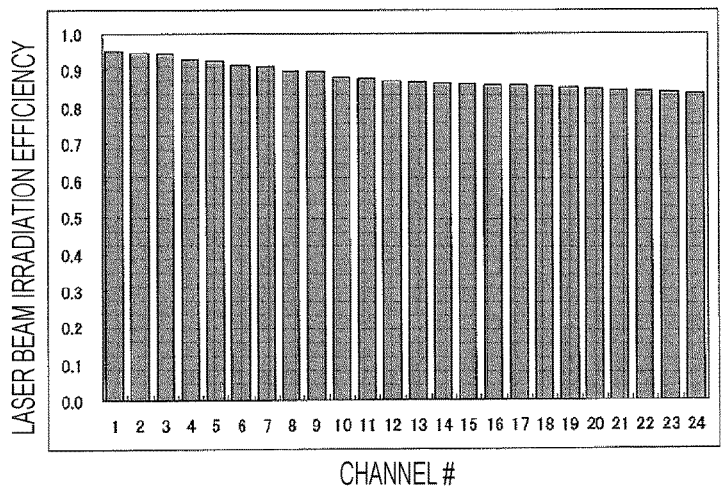

As illustrated in FIGS. 15(c) and 15(d), a large part of the laser beam 4 passes through the channels 2 and 3 and the channels 2 and 3 are simultaneously irradiated with the laser beam 4 efficiently, different from FIGS. 13(c) and 13(d). This is because the refraction function by the channel 2 clarified in the configuration f is offset by the refraction function by the channel 3 added in the configuration g. As illustrated in FIG. 15(e), the laser-beam irradiation efficiency of all of the channels from #1 to #24 is maintained high at 80% or more. This result reaches a level comparable to a level of the ideal result of the configuration e of FIG. 12(e). Therefore, it is known that the configuration g is a configuration in which the plurality of channels 2 and 3 provided in the microchip 1 are simultaneously irradiated with the laser beam 4 efficiently by the side-entry method and the simultaneous fluorescence detection and the simultaneous electrophoresis analysis using the 12 channels 2 of the odd numbers # are enabled with the high sensitivity.

FIGS. 16(a) to 16(e) are diagrams illustrating a configuration g' to be a form of the microchip 1 according to the present invention and results of laser-beam tracking simulations of the side-entry laser-beam irradiation thereon. The configuration g' of the microchip 1 follows the configuration g of FIG. 2. Hereinafter, the configuration g' is described. However, it may be thought that the same description as the configuration g is realized unless otherwise specified. A difference of the configuration g' and the configuration g is only a cross-sectional shape of each of the channels 2 and 3.

As illustrated in FIGS. 16(a) and 16(b), the cross-sectional shape of each of the channels 2 and 3 of the configuration g' is an isosceles trapezoidal shape and an isosceles trapezoid has a lower base of 50 μm, a height of 50 μm, a base angle of 94 degrees, and an upper base of about 57.0 μm. That is, the configuration g' may be expressed as a configuration in which the odd numbers # and the even numbers # in 24 channels are set to the channels 2 and the channels 3, respectively, and the channels 2 and the channels 3 are alternately arranged, different from the configuration f'. Here, in FIGS. 16(a) and 16(b), the channels 3 are outlined to easily view the channels 3. Here, a refraction angle of the laser beam 4 by the channel 2 is calculated as $\varepsilon_2=-0.63$ degrees by the expression (7), but a refraction angle of the laser beam 4 by the channel 3 is calculated as $\varepsilon_3=0.68$ degrees by the expression (8). Therefore, $\varepsilon_2+\varepsilon_3=0.05$ degrees is realized and the expression (9) is satisfied. That is, the magnitude of the net refraction angle of the laser beam 4 by a set of channels 2 and 3 is smaller than the magnitude of the refraction angle of the laser beam 4 by only the channel 2.

As illustrated in FIGS. 16(c) and 16(d), a large part of the laser beam 4 passes through the channels 2 and 3 and the channels 2 and 3 are simultaneously irradiated with the laser beam 4 efficiently, different from FIGS. 14(c) and 14(d). This is because the refraction function by the channel 2 clarified in the configuration f' is offset by the refraction function by the channel 3 added in the configuration g'. As illustrated in FIG. 16(e), the laser-beam irradiation efficiency of all of the channels from #1 to #24 is maintained high at 70% or more. This result is slightly inferior to the result of the configuration g of FIG. 15(e), but reaches a level sufficient for the highly sensitive fluorescence detection. Therefore, it is known that the configuration g' is a configuration in which the plurality of channels 2 and 3 provided in the microchip 1 are simultaneously irradiated with the laser beam 4 efficiently by the side-entry method and the simultaneous fluorescence detection and the simultaneous electrophoresis analysis using the 12 channels 2 of the odd numbers # are enabled with the high sensitivity.

Third Embodiment

Figure 17A:
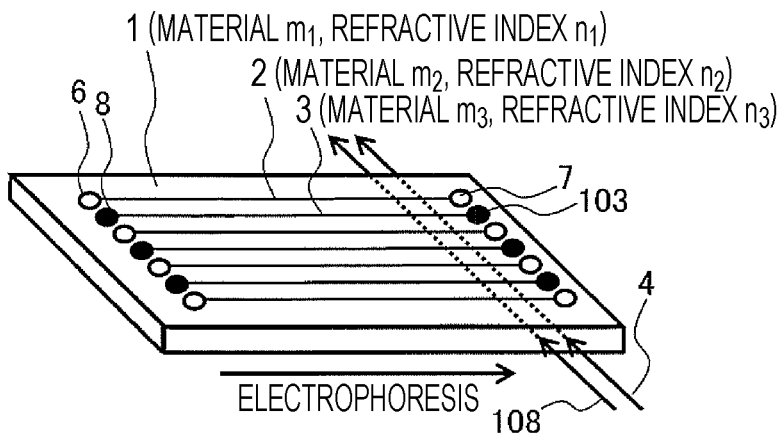
FIGS. 17A-17C are schematic diagrams illustrating an example of a multichannel fluorescence detection system according to the present invention.
Figure 17B:
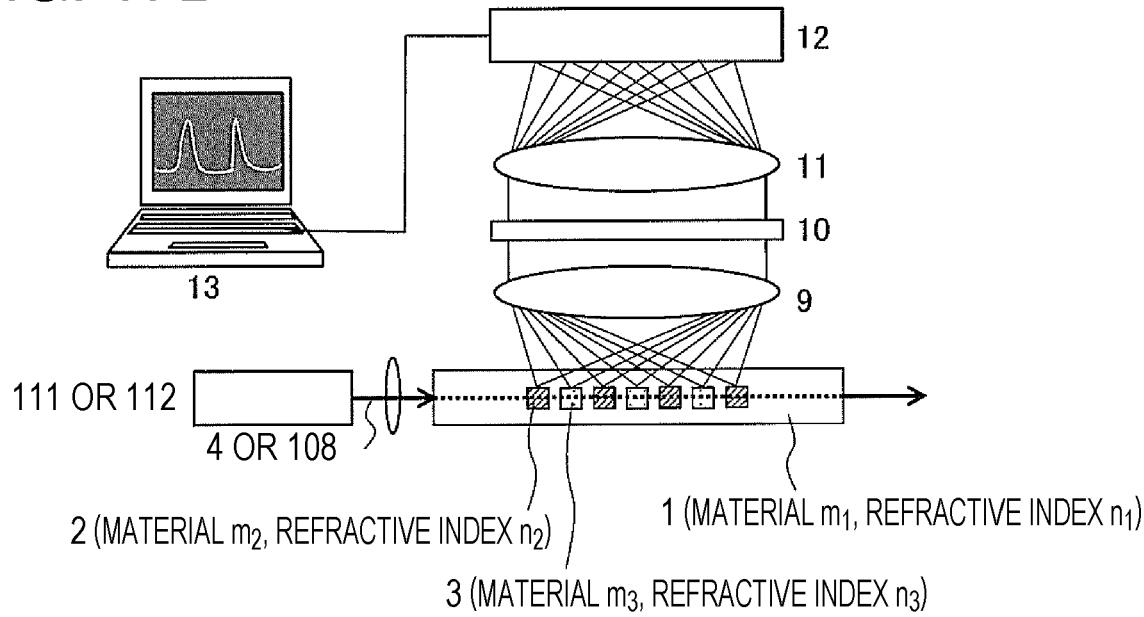
Figure 17C:
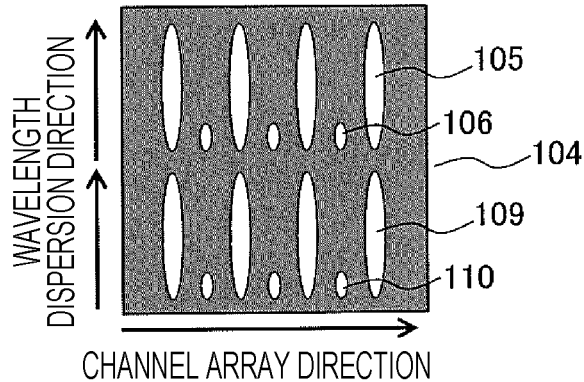

FIGS. 17(a) to 17(c) are schematic diagrams illustrating an example of a multichannel fluorescence detection system according to the present invention. This example shows a system for performing electrophoresis analysis of DNA included in a biological sample using a plurality of laser beams. FIG. 17(a) illustrates a perspective view of a microchip 1, FIG. 17(b) illustrates a cross-section of the microchip 1 including a side-entry axis of a laser beam 4 or a laser beam 108 and a cross-section of a fluorescence detection optical system, and a data analysis system 13, and FIG. 17(c) illustrates a two-dimensional fluorescent detection images obtained by a two-dimensional sensor 12. Hereinafter, description is given on the basis of a difference of FIGS. 17(a) to 17(c) and FIGS. 5(a) to 5(c).

As illustrated in FIG. 17(a), a plurality of channels 2 and 3 are irradiated with the laser beams 4 and 108 in parallel to each other, vertically to long axes of the individual channels 2 and 3, and at an interval in a long axis direction of the individual channels 2 and 3, along an array plane of the plurality of channels 2 and 3. The laser beam 4 has a wavelength of 505 nm, but the laser beam 108 has a wavelength of 635 nm. Both the laser beams 4 and 108 are parallel light beams having a diameter of 50 μm. Here, as illustrated in FIG. 17(a), a side-entry axis exists for each laser beam. Even in any side-entry axis, because conditions such as a cross-sectional shape, an array interval, and a refractive index of each channel are the same, the same side-entry method can be realized. Generally, because a refractive index of each material is different according to a wavelength, this may affect performance of the side-entry method. However, because wavelength dependency of a refractive index of each material used in the present invention is small, an influence thereof is small.

FIG. 17(b) illustrates a cross-sectional view including the side-entry axis of the laser beam 4 or the laser beam 108 (there is no difference). The laser beam 108 is emitted from a laser light source 112. FIG. 17(c) illustrates an obtained two-dimensional fluorescent detection images. In addition to wavelength dispersion images 105 of fluorescence and laser beam scattering from each channel 2 by excitation of the laser beam 4 and wavelength dispersion images 106 of laser beam scattering from each channel 3, wavelength dispersion images 109 of fluorescence and laser beam scattering from each channel 2 by excitation of the laser beam 108 and wavelength dispersion images 110 of laser beam scattering from each channel 3 are measured independently. By the above configuration, the number of kinds of fluorescence capable of being simultaneously detected in each channel 2 is increased or different fluorescence is separately detected with high precision, so that a very small amount of fluorescence can be identified. In this embodiment, different samples are labeled with different fluorescent dyes and are simultaneously analyzed by the same channel, so that the throughput is improved. In the following description, the laser beam 4 is described. However, the same description is realized in the laser beam 108.

Figure 18A:
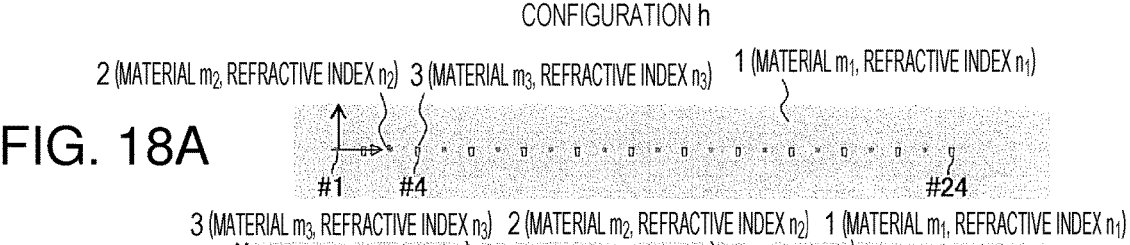
FIGS. 18A-18E are diagrams illustrating a microchip configuration h and laser-beam tracking simulation results of a side-entry laser-beam irradiation.
Figure 18B:

FIGS. 18(a) to 18(e) are diagrams illustrating a configuration h to be a form of the microchip 1 according to the present invention and results of laser-beam tracking simulations of the side-entry laser-beam irradiation thereon. The configuration h is obtained by changing the cross-sectional shape of the channel 3 of the configuration g' of FIGS. 16(a) to 16(e). As illustrated in FIGS. 18(a) and 18(b), cross-sectional shapes of the channels 2 of odd numbers # are not changed, but heights of cross-sectional shapes of the channels 3 of even numbers # are increased from 50 μm to 100 μm without changing a base angle of an isosceles trapezoid. An upper base of each channel 2 and an upper base of each channel 3 are matched with on the same plane, that is, a boundary surface 5, similar to the case of the configuration g'. Meanwhile, a lower base of each channel 2 and a lower base of each channel 3 are arranged on different planes, respectively. That is, the cross-sectional shape of the channel 3 of the configuration h is a shape obtained by doubling a depth at the same upper base and draft angle as the cross-sectional shape of the configuration g'. More specifically, the cross-sectional shape of the channel 3 has a lower base of about 43.0 μm, the height of 100 μm, the base angle of 94 degrees, and the upper base of about 57.0 μm. Similar to the case of the second embodiment, the microchip 1 having the above configuration can be easily manufactured by bounding upper and lower components.

All of a material $m_1$ of the microchip 1, a material $m_2$ filled into the channel 2, and a material $m_3$ filled into the channel 3 are equal to the materials of the configuration g'. Here, refraction angles of the laser beam 4 by the channel 2 and the channel 3 are $\varepsilon_2$=−0.63 degrees and $\varepsilon_3$=0.68 degrees, respectively, similar to the configuration g'. Meanwhile, because the depth of the channel 3 of the configuration h is twice the depth in the case of the configuration g', beam elements deflected from the side-entry axis to the side opposite to the boundary surface 5, that is, the lower side of FIGS. 18(a) and 18(b) and deviated from the individual channels 2 and 3 in the configuration g' in beam elements of the laser beam 4 can be refracted in a direction of the side-entry axis in the configuration h.

Figure 18C:
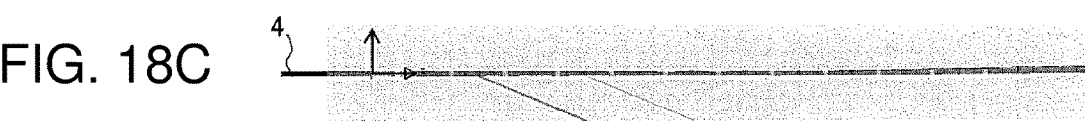
Figure 18D:
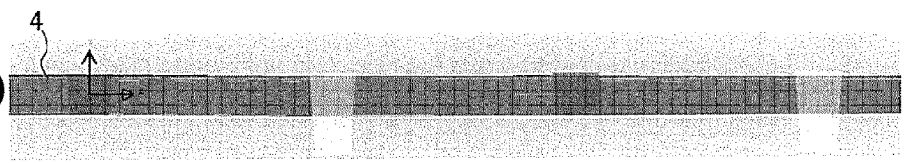
Figure 18E:
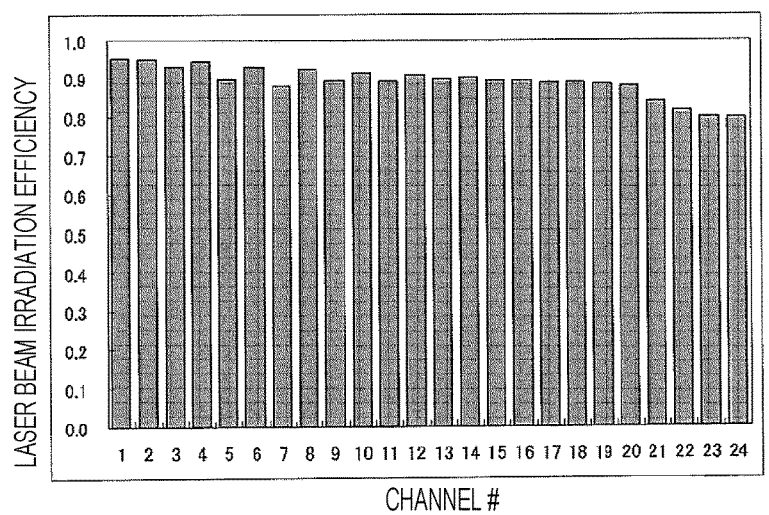

As illustrated in FIGS. 18(c) and 18(d), a large part of the laser beam 4 passes through the channels 2 and 3 and the channels 2 and 3 are simultaneously irradiated with the laser beam 4 efficiently, as compared with FIGS. 16(c) and 16(d). This is because the beam elements deviated from a channel in the configuration g' can be used to irradiate the following channels in the configuration h. As a result, laser-beam irradiation efficiency of all channels from #1 to #24 is maintained high at 80% or more, as illustrated in FIG. 18(e). Therefore, it is known that the configuration h is a configuration in which the plurality of channels 2 and 3 provided in the microchip 1 are simultaneously irradiated with the laser beam 4 efficiently by the side-entry method and the simultaneous fluorescence detection and the simultaneous electrophoresis analysis using the 12 channels 2 of the odd numbers # are enabled with the high sensitivity.

Figure 19A:
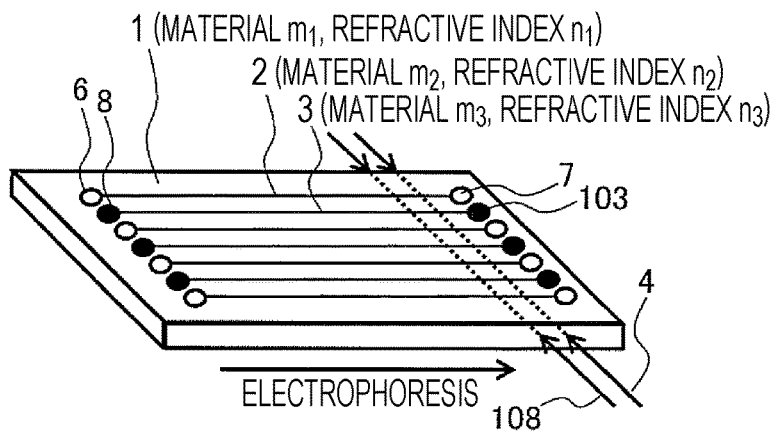
FIGS. 19A and 19B are schematic diagrams illustrating an example of a multichannel fluorescence detection system according to the present invention.
Figure 19B:
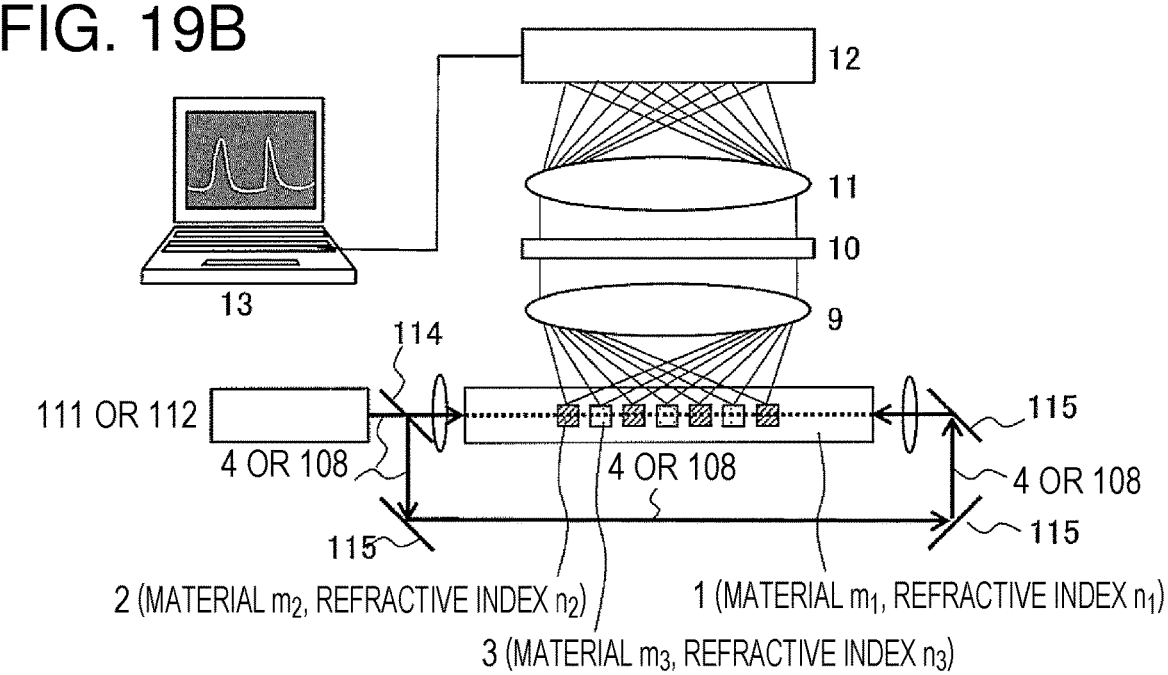

FIGS. 19(a) and 19(b) are schematic diagrams illustrating an example of a multichannel fluorescence detection system according to the present invention. This example shows a microchip electrophoresis analysis system that irradiates two-divided laser beams from both sides of a microchip 1. FIG. 19(a) illustrates a perspective view of a microchip 1 and FIG. 19(b) illustrates a cross-section of the microchip 1 including a side-entry axis of a laser beam 4 or a laser beam 108 and a cross-section of a fluorescence detection optical system, and a data analysis system 13.

In a configuration h', to equalize laser-beam irradiation efficiency between the channels, as illustrated in FIGS. 19(a) and 19(b), the laser beam 4 and the laser beam 108 are divided by two using a half mirror 114, divided beams are made to face each other at both sides of the array plane of the channels 2 and 3 by using a plurality of mirrors 115, center axes of the divided beams are matched with the individual side-entry axes, and the divided beams are irradiated. Two-dimensional fluorescent detection images obtained at that time are the same as those in FIG. 17(c). The other conditions are the same as the conditions in the configuration h. In the following description, the laser beam 4 is described. However, the same description is realized in the laser beam 108.

Figure 20:
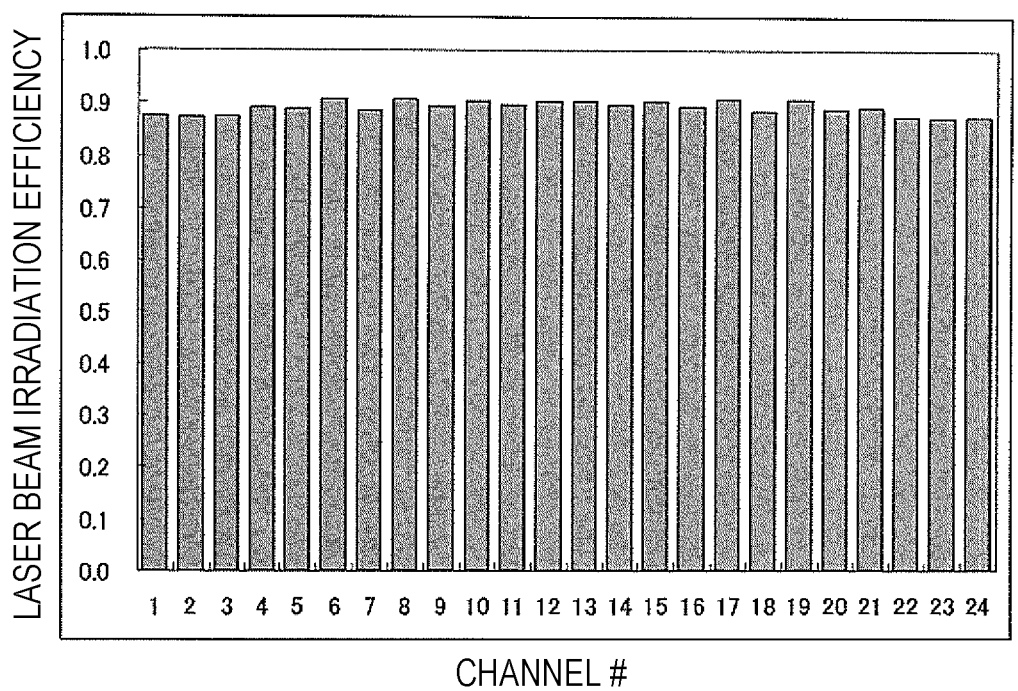
FIG. 20 is a diagram illustrating laser-beam tracking simulation results of a side-entry laser-beam irradiation of a microchip configuration h'.

FIG. 20 illustrate laser-beam irradiation efficiency of each channel in the configuration h'. It is known that the laser-beam irradiation efficiency between the channels can be equalized as compared with the configuration h. Here, total strengths of the divided beams are set to 0.5. A standard deviation of the laser-beam irradiation efficiency between the channels is 0.04 in the configuration h. Meanwhile, in the configuration h', the standard deviation can be greatly reduced to 0.01. Thereby, fluorescence emitted from each channel can be detected equally with high sensitivity and a fluorescence detection dynamic range can be extended effectively.

In the present invention, it is important to match the center axis of the laser beam 4 with the side-entry axis. As a mechanism for realizing this surely, a method that uses Raman scattering and fluorescence by irradiation of the laser beam 4 for the material $m_2$ or $m_3$ filled into each channel 2 or 3 as indexes and finely adjusts a relative position relation of the laser beam 4 and the microchip 1 or the array plane of the channels such that Raman scattering and fluorescence are maximized or are detected separately between the channels is effective. In addition, to use the method more effectively, fluorescent dyes can be mixed in the material $m_3$ filled into each channel 3 not to affect fluorescence detection on each channel 2 while the indexes are clarified more.

In all of the embodiments described above, the electrophoresis analysis using the microchip has been exemplified. However, the present invention can be applied to other analysis using the microchip. For example, PCR of a plurality of samples can be performed in a plurality of different channels, the laser beam is incident on the channels, the simultaneous fluorescence detection can be performed, and target DNA sequences included in the plurality of samples can be analyzed quantitatively with high sensitivity. In addition, micro TAS or Lab on a Chip can be configured by integrating a pretreatment process into the microchip according to the present invention. For example, the present invention can be applied to a system for pouring a human blood sample into the microchip, performing blood cell separation and genome extraction in the microchip, dividing the sample, introducing the divided samples into the plurality of channels, quantitatively analyzing existence of a plurality of DNA sequences associated with a certain disease in the individual channels with high sensitivity, and performing gene diagnosis of the certain disease on the basis of a result thereof. In this application, because it is necessary to produce the microchip in large quantities at a low cost and cause the microchip to be disposable to prevent contamination between the samples, an effect of the present invention is shown particularly. In addition, the present invention can be applied to various applications such as immunity analysis, a flow cytometer, single cell analysis, and a micro reactor.

In this embodiment, as illustrated in FIGS. 17 and 19, the fluorescence emitted from each channel 2 is measured by the common fluorescence detection system. However, a fluorescence detection system independent for each channel may be constructed. By this configuration, the crosstalk between the channels can be further reduced. In addition, a light reflection prevention film may be formed on an external surface of the microchip 1 of a direction opposite to a direction where the fluorescence detection is performed. The reflection prevention film needs to be coupled directly to the external surface of the microchip 1. For example, a material to absorb light may be arranged to contact the external surface of the microchip 1. By this configuration, the possibility of occurrence of the crosstalk, that is, light components propagating to the side opposite to the fluorescence detection system are reflected on the external surface of the microchip 1 or the outside and reflected light thereof is detected by the fluorescence detection system, can be reduced.

The present invention is not limited to the embodiments described above and various modifications are included in the present invention. For example, the embodiments are described in detail to facilitate the description of the present invention and the present invention is not limited to embodiments in which all of the described configurations are included. In addition, a part of the configurations of the certain embodiment can be replaced by the configurations of other embodiments or the configurations of other embodiments can be added to the configurations of the certain embodiment. In addition, for a part of the configurations of the individual embodiments, addition, removal, and replacement of other configurations can be performed.

REFERENCE SIGNS LIST 1 microchip
$m_1$ material of microchip 1
$n_1$ refractive index of material of microchip 1
2 channel
$m_2$ internal material of channel 2
$n_2$ refractive index of internal material of channel 2
$r_2$ diameter of channel 2
3 channel
$m_3$ internal material of channel 3
$n_3$ refractive index of internal material of channel 3
$r_3$ diameter of channel 3
4 laser beam
5 boundary surface
6 inlet port of channel 2
7 outlet port of channel 2
8 inlet port of channel 3
9 collimating lens
10 filter and diffraction grating
11 imaging lens
12 two-dimensional sensor
13 data analysis system
103 outlet port of channel 3
104 two-dimensional fluorescence detection images
105, 109 wavelength dispersion images of fluorescence and laser beam scattering from channel 2
106, 110 wavelength dispersion images of laser beam scattering from channel 3
107 rubber plug
108 laser beam
111 laser light source
112 laser light source
113 common outlet port of channel 2 and channel 3
114 half mirror
115 mirror

The invention claimed is:

1. A microchip, comprising:
a plurality of channels provided in an optically transparent solid material, the optically transparent solid material having a refractive index $n_1$, wherein
long axes of the plurality of channels are arranged in parallel with each other on a same plane in at least a partial region of the plurality of channels in the optically transparent solid material,
the plurality of channels includes at least first channels filled with a first material with a refractive index $n_2$ and second channels filled with a second material with a refractive index $n_3$, and
the first channels and the second channels are aligned in the partial region with a cross-sectional shape perpendicular to the respective long axes so that refractions by side surfaces of cross-sectional shapes of the first channels and refractions by side surfaces of cross-sectional shapes of the second channels are in opposite directions and offset such that a net refraction of the first channels and the second channels is weakened.

2. The microchip according to claim 1, wherein the first channels and the second channels are alternately arranged in the partial region.

3. The microchip according to claim 1, wherein the second material is a liquid and both ends of the second channels are sealed to prevent the second material from being removed.

4. The microchip according to claim 1, wherein, the cross-sectional shapes are the same for all of the plurality of channels.

5. The microchip according to claim 1, wherein a relation of $n_2<n_1<n_3$ is satisfied.

6. The microchip according to claim 5, wherein each of the plurality of channels has a trapezoidal cross-sectional shape perpendicular to the respective long axes in the partial region.

7. The microchip according to claim 6, wherein,
two base angles of the trapezoidal cross-sectional shape are $90+D_L$ and $90+D_R$, respectively, where $D_L$ and $D_R$ are set to 0 degree $<D_L<90$ degrees and 0 degree $<D_R<90$ degrees, respectively, and $D=(D_L+D_R)/2$ is set, and a relation of $|\sin^{-1}[\sin\{2*D-\sin-1(\sin(D)*n_1/n_2)\}*n_2/n_1]-D+\sin^{-1}[\sin\{2*D-\sin^{-1}(\sin(D)*n_1/n_3)\}*n_3/n_1]-D|<|\sin^{-1}[\sin\{2*D-\sin^{-1}(\sin(D)*n_1/n_2)\}*n_2/n_1]-D|$ is satisfied.

8. The microchip according to claim 6, wherein the trapezoidal cross-sectional shape is isosceles trapezoidal shape.

9. The microchip according to claim 1, wherein a corner of each of the cross-sectional shapes is round.

10. A multichannel fluorescence detection system, comprising:
a microchip in which a plurality of channels are provided in an optically transparent solid material, the optically transparent solid material having a refractive index $n_1$, such that long axes of the channels are arranged in parallel with each other on a same plane in at least a partial region of the plurality of channels in the transparent solid material;

a laser light source;

an irradiation optical subsystem configured to cause a laser beam generated from the laser light source to be incident perpendicularly to the long axes of the plurality of channels arranged in parallel, along the same plane from a side surface of the microchip; and a fluorescence detection optical subsystem configured to separately detect fluorescence generated from fluorescent analytes in the plurality of channels by irradiation of the laser beam, wherein the plurality of channels includes at least first channels filled with a first material with a refractive index $n_2$, and second channels filled with a second material with a refractive index $n_3$;

wherein the first channels also include fluorescent analytes to be detected; and wherein the first channels and the second channels are aligned in the partial region with a cross-sectional shape perpendicular to the respective long axes so that refractions by side surfaces of cross-sectional shapes of the first channels and refractions by side surfaces of cross-sectional shapes of the second channels are in opposite directions and offset such that a net refraction of the first channels and the second channels is weakened.

11. The multichannel fluorescence detection system according to claim 10, wherein a plurality of laser beams are provided and the plurality of laser beams are incident on different positions along long axis directions of the plurality of channels.

12. The multichannel fluorescence detection system according to claim 10, wherein a relation of $n_2 < n_1 < n_3$ is satisfied.

13. The multichannel fluorescence detection system according to claim 12, wherein each of the plurality of channels has a trapezoidal cross-sectional shape perpendicular to the respective long axes in the partial region.

14. The multichannel fluorescence detection system according to claim 13, wherein, two base angles of the trapezoidal cross-sectional shape are $90+D_L$ and $90+D_R$, respectively, where $D_L$ and $D_R$ are set to 0 degree $<D_L<90$ degrees and 0 degree $<D_R<90$ degrees, respectively, and $D=(D_L+D_R)/2$ is set, and a relation of $|\sin^{-1}[\sin\{2*D-\sin^{-1}(\sin(D)*n_1/n_2)\}*n_2/n_1]-D+\sin^{-1}[\sin\{2*D-\sin^{-1}(\sin(D)*n_1/n_3)\}*n_3/n_1]-D| < |\sin^{-1}[\sin\{2*D-\sin^{-1}(\sin(D)*n_1/n_2)\}*n_2/n_1]-D|$ is satisfied.

15. The multichannel fluorescence detection system according to claim 13, wherein the trapezoidal cross-sectional shape is isosceles trapezoidal shape.

16. The multichannel fluorescence detection system according to claim 10, wherein a corner of each of the cross-sectional shapes is round.

17. A method of manufacturing a microchip in which a plurality of channels are provided in an optically transparent solid material, such that long axes of the plurality of channels are arranged in parallel with each other on a same plane in at least a partial region of the plurality of channels in the transparent solid material, comprising the steps of:

manufacturing a first plate-like optically transparent solid material, on a surface of which a plurality of grooves are formed to be parallel to each other in at least the partial region of the plurality of grooves, and which has a refractive index $n_1$, by injection molding;

sticking a second plate-like optically transparent solid material with a refractive index $n_1$ on the first plate-like optically transparent solid material to convert the plurality of grooves into the plurality of channels;

the plurality of channels includes at least first channels and second channels; and filling a material with a refractive index $n_3$ into the second channels of the plurality of channels, wherein the refractive indexes $n_1$ and $n_3$ satisfy a relation of $n_1 < n_3$, so that the first channels and the second channels are aligned in the partial region with a cross-sectional shape perpendicular to the respective long axes and refractions by side surfaces of cross-sectional shapes of the first channels and refractions by side surfaces of cross-sectional shapes of the second channels are in opposite directions and offset such that a net refraction of the first channels and the second channels is weakened.

18. The method according to claim 17, wherein the material with the refractive index $n_3$ is a liquid and the method further includes a step of sealing both ends of the second channels filled with the material with the refractive index $n_3$ after filling the materials with the refractive index $n_3$.

19. The method according to claim 17, further comprising:

a step of filling an electrophoretic medium with a refractive index $n_2$ into the first channels, wherein the refractive index $n_2$ satisfies a relation of $n_2 < n_1 < n_3$.

20. The method according to claim 19, wherein each of the plurality of channels has a trapezoidal cross-sectional shape perpendicular to the respective long axes in the partial region.

21. The method according to claim 20, wherein each of the trapezoidal cross-sectional shapes is an isosceles trapezoidal shape.

22. The method according to claim 19, wherein a corner of each of the cross-sectional shapes is round.

* * * * *